(12) United States Patent
Xu et al.

(10) Patent No.: US 11,052,934 B2
(45) Date of Patent: Jul. 6, 2021

(54) FOLDABLE STROLLERS AND RELATED METHODS

(71) Applicant: Kolcraft Enterprises, Inc., Chicago, IL (US)

(72) Inventors: Yong Huang Xu, Zhangzhou (CN); Mark Eyman, Chicago, IL (US); Peter Rolicki, Wheeling, IL (US); Wes Thomas, Racine, WI (US); Sebastiaan Ernst Raak, Enschede (NL); Martijn van Heteren, Hengelo (NL); Aragon He, Zhangzhou (CN)

(73) Assignee: Kolcraft Enterprises, Inc., Chicago, IL (US)

( * ) Notice: Subject to any disclaimer, the term of this patent is extended or adjusted under 35 U.S.C. 154(b) by 0 days.

(21) Appl. No.: 16/322,350

(22) PCT Filed: Jul. 27, 2017

(86) PCT No.: PCT/CN2017/094679
§ 371 (c)(1),
(2) Date: Jan. 31, 2019

(87) PCT Pub. No.: WO2019/019097
PCT Pub. Date: Jan. 31, 2019

(65) Prior Publication Data
US 2019/0193769 A1     Jun. 27, 2019

(51) Int. Cl.
*B62B 7/08*     (2006.01)
(52) U.S. Cl.
CPC ............... *B62B 7/083* (2013.01); *B62B 7/08* (2013.01); *B62B 2205/20* (2013.01); *B62B 2205/22* (2013.01); *B62B 2205/26* (2013.01)
(58) Field of Classification Search
CPC .................................. B62B 7/083; B62B 7/08
See application file for complete search history.

(56) References Cited

U.S. PATENT DOCUMENTS 2,907,372 A   10/1959   Leger
3,084,949 A    4/1963   Forster
(Continued)

FOREIGN PATENT DOCUMENTS

BE   1014755    3/2004
CN   2853548    1/2007
(Continued)

OTHER PUBLICATIONS

Patent Cooperation Treaty, "International Search Report and Written Opinion," issued in connection with International Application No. PCT/CN2017/094679, dated Mar. 27, 2018, 10 pages.
(Continued)

*Primary Examiner* — John D Walters
*Assistant Examiner* — James J Triggs
(74) *Attorney, Agent, or Firm* — Hanley, Flight & Zimmerman, LLC

(57) ABSTRACT

Foldable strollers and related methods are disclosed herein. An example frame for use with a stroller includes a first leg, a second leg, a first joint to couple the first leg and the second leg, a handle arm, and a second joint to couple the handle arm and the first leg. The second joint includes a first portion having a pocket and a second portion including a lock slidably disposed in the second portion. The lock is to be removably coupled to the pocket. The handle arm is to rotate relative to the first leg via the second joint when the lock is removed from the pocket. The rotation of the handle via the second joint is to enable the second leg to rotate relative to the first leg via the first joint to fold the frame.

20 Claims, 12 Drawing Sheets

(56) References Cited

U.S. PATENT DOCUMENTS

| | | |
|---|---|---|
| 4,142,027 A | 2/1979 | Tsygankov et al. |
| 4,191,397 A | 3/1980 | Kassai |
| 4,354,689 A | 10/1982 | Perego |
| 4,786,064 A | 11/1988 | Baghdasarian |
| 4,834,403 A | 5/1989 | Yanus et al. |
| 4,953,880 A | 9/1990 | Sudakoff et al. |
| 5,197,753 A | 3/1993 | Liu |
| 5,201,535 A | 4/1993 | Kato et al. |
| 5,203,577 A | 4/1993 | Kato et al. |
| 5,215,320 A | 6/1993 | Chen |
| 5,230,523 A | 7/1993 | Wilhelm |
| 5,240,265 A | 8/1993 | Huang |
| 5,265,931 A | 11/1993 | Ryan |
| 5,364,137 A | 11/1994 | Shimer |
| 5,499,831 A | 3/1996 | Worth et al. |
| 5,516,142 A | 5/1996 | Hartan |
| 5,517,718 A | 5/1996 | Eichhorn |
| 5,562,300 A | 10/1996 | Nelson |
| 5,596,910 A | 1/1997 | Bauer et al. |
| 5,601,297 A | 2/1997 | Stein |
| 5,625,923 A | 5/1997 | Huang |
| 5,634,537 A | 6/1997 | Thorn |
| 5,660,430 A | 8/1997 | Clarke |
| 5,676,386 A | 10/1997 | Huang |
| 5,718,439 A | 2/1998 | Wang |
| 5,765,665 A | 6/1998 | Cheng et al. |
| 5,794,951 A | 8/1998 | Corley et al. |
| 5,845,917 A | 12/1998 | Huang |
| 5,845,924 A | 12/1998 | Huang |
| 5,893,606 A | 4/1999 | Chiang |
| 5,935,010 A | 8/1999 | Clarke |
| 5,975,545 A | 11/1999 | Hu |
| 5,988,670 A | 11/1999 | Song et al. |
| 6,022,042 A | 2/2000 | Hartenstine |
| 6,045,145 A | 4/2000 | Lan |
| 6,062,577 A | 5/2000 | Tan |
| 6,070,890 A | 6/2000 | Haut et al. |
| 6,086,086 A | 7/2000 | Hanson et al. |
| 6,086,087 A | 7/2000 | Yang |
| 6,102,167 A | 8/2000 | Chiu |
| 6,102,431 A | 8/2000 | Sutherland et al. |
| 6,120,041 A | 9/2000 | Gehr, Jr. et al. |
| 6,120,054 A | 9/2000 | Hu |
| 6,155,592 A | 12/2000 | Hsia |
| 6,163,924 A | 12/2000 | Ward, Jr. et al. |
| 6,176,459 B1 | 1/2001 | Wilcox et al. |
| 6,176,507 B1 | 1/2001 | Bigo et al. |
| 6,193,263 B1 | 2/2001 | Lin |
| 6,238,125 B1 | 5/2001 | Lin |
| 6,241,274 B1 | 6/2001 | Huang |
| 6,250,652 B1 | 6/2001 | Nelson |
| 6,264,007 B1 | 7/2001 | Norton et al. |
| 6,270,111 B1 | 8/2001 | Hanson et al. |
| 6,286,844 B1 | 9/2001 | Cone, II et al. |
| 6,308,805 B1 | 10/2001 | Lan |
| 6,318,807 B1 | 11/2001 | Perego |
| 6,341,672 B1 | 1/2002 | Yang et al. |
| 6,347,777 B1 | 2/2002 | Webber et al. |
| 6,375,213 B1 | 4/2002 | Suzuki |
| 6,375,260 B1 | 4/2002 | Hiramatsu et al. |
| 6,398,233 B1 | 6/2002 | Liang et al. |
| 6,402,114 B1 | 6/2002 | Carnahan et al. |
| 6,412,809 B1 | 7/2002 | Bigo et al. |
| 6,439,521 B1 | 8/2002 | Wilson et al. |
| 6,443,468 B1 | 9/2002 | Eros |
| 6,446,990 B1 | 9/2002 | Nania et al. |
| 6,478,327 B1 | 11/2002 | Hartenstine et al. |
| 6,478,328 B1 | 11/2002 | Yeh et al. |
| 6,478,376 B2 | 11/2002 | Hayashi et al. |
| 6,499,786 B2 | 12/2002 | Takahashi |
| 6,502,669 B1 | 1/2003 | Harris |
| 6,513,827 B1 | 2/2003 | Barenbrug |
| 6,554,298 B1 | 4/2003 | Bidwell |
| 6,557,870 B2 | 5/2003 | Cheng |
| 6,557,885 B1 | 5/2003 | Kakuda |
| 6,572,134 B2 | 6/2003 | Barrett et al. |
| 6,592,132 B2 | 7/2003 | Bidwell |
| 6,595,583 B2 | 7/2003 | Hou |
| 6,598,712 B1 | 7/2003 | Sun |
| 6,626,452 B2 | 9/2003 | Yang et al. |
| 6,666,473 B2 | 12/2003 | Hartenstine et al. |
| 6,692,015 B2 | 2/2004 | Perego |
| 6,715,783 B1 | 4/2004 | Hanson et al. |
| 6,736,451 B1 | 5/2004 | Chen |
| 6,742,791 B2 | 6/2004 | Lan |
| 6,793,283 B1 | 9/2004 | Sipos |
| 6,793,292 B2 | 9/2004 | Lan |
| 6,830,260 B2 | 12/2004 | Everett |
| 6,851,700 B2 | 2/2005 | Yoshie et al. |
| 6,863,286 B2 | 3/2005 | Eros et al. |
| 6,869,096 B2 | 3/2005 | Allen et al. |
| 6,896,286 B2 | 5/2005 | Lin |
| 6,908,087 B2 | 6/2005 | Wintersgill et al. |
| 6,983,986 B2 | 1/2006 | Santamaria |
| 6,991,248 B2 | 1/2006 | Valdez et al. |
| 7,017,937 B2 | 3/2006 | Williams |
| 7,032,922 B1 | 4/2006 | Lan |
| 7,044,497 B2 | 5/2006 | Hartenstine et al. |
| 7,059,452 B2 | 6/2006 | Chen |
| 7,070,197 B2 | 7/2006 | Chen |
| 7,083,175 B1 | 8/2006 | Liu |
| 7,118,121 B2 | 10/2006 | Cheng et al. |
| 7,188,858 B2 | 3/2007 | Hartenstine et al. |
| 7,210,699 B2 | 5/2007 | Lan |
| 7,213,818 B2 | 5/2007 | Chang |
| 7,232,019 B2 | 6/2007 | Chang et al. |
| 7,267,359 B1 | 9/2007 | Yang et al. |
| 7,278,652 B2 | 10/2007 | Riedl et al. |
| 7,281,732 B2 | 10/2007 | Fox et al. |
| 7,338,122 B2 | 3/2008 | Hei et al. |
| 7,367,581 B2 | 5/2008 | Yang |
| 7,370,913 B2 | 5/2008 | Takamizu et al. |
| 7,377,537 B2 | 5/2008 | Li |
| 7,383,925 B2 | 6/2008 | Chen |
| 7,396,039 B2 | 7/2008 | Valdez et al. |
| 7,401,803 B1 | 7/2008 | Lai |
| 7,404,569 B2 | 7/2008 | Hartenstine et al. |
| 7,410,186 B2 | 8/2008 | Hartenstine et al. |
| D576,084 S | 9/2008 | Dotsey et al. |
| 7,445,228 B2 | 11/2008 | Henry |
| 7,455,336 B2 | 11/2008 | Bäumchen et al. |
| 7,475,900 B2 | 1/2009 | Cheng |
| 7,497,449 B2 | 3/2009 | Logger |
| 7,497,461 B2 | 3/2009 | Emerson |
| 7,500,692 B2 | 3/2009 | Espenshade |
| 7,537,093 B2 | 5/2009 | Chen |
| 7,550,692 B2 | 6/2009 | Bong |
| 7,566,068 B2 | 7/2009 | Santamaria |
| 7,597,396 B2 | 10/2009 | Longenecker et al. |
| 7,600,775 B2 | 10/2009 | Chen et al. |
| 7,614,641 B2 | 11/2009 | Hartenstine et al. |
| 7,618,093 B2 | 11/2009 | Hung-Chung |
| 7,632,035 B2 | 12/2009 | Cheng |
| 7,658,399 B2 | 2/2010 | Van Dijk |
| 7,677,590 B2 | 3/2010 | Dotsey et al. |
| 7,681,894 B2 | 3/2010 | Santamaria |
| 7,686,322 B2 | 3/2010 | Longenecker et al. |
| 7,686,323 B2 | 3/2010 | Chen |
| 7,694,980 B2 | 4/2010 | Dotsey et al. |
| 7,694,995 B2 | 4/2010 | Dotsey et al. |
| 7,712,765 B2 | 5/2010 | Chen et al. |
| 7,753,398 B2 | 7/2010 | Yang |
| 7,766,366 B2 | 8/2010 | Li |
| 7,766,367 B2 | 8/2010 | Dotsey et al. |
| 7,780,183 B2 | 8/2010 | Chen et al. |
| 7,784,801 B2 | 8/2010 | Yeh |
| 7,798,500 B2 | 9/2010 | Den Boer |
| 7,798,515 B2 | 9/2010 | Valdez et al. |
| 7,832,755 B2 | 11/2010 | Nolan et al. |
| 7,871,099 B2 | 1/2011 | Gilbertson et al. |
| 7,871,100 B2 | 1/2011 | Chen et al. |
| 7,900,952 B2 | 3/2011 | Cone, II |
| 7,909,353 B2 | 3/2011 | Nolan et al. |
| 7,918,001 B2 | 4/2011 | Buckingham |

(56) References Cited

U.S. PATENT DOCUMENTS

| | | |
|---|---|---|
| 7,922,182 B2 | 4/2011 | Van der Vegt |
| 7,946,650 B2 | 5/2011 | Gillet |
| 7,971,884 B2 | 7/2011 | Lundh |
| 7,971,897 B2 | 7/2011 | Pike et al. |
| 7,971,933 B2 | 7/2011 | Tuckey et al. |
| D643,344 S | 8/2011 | Barenbrug |
| D643,345 S | 8/2011 | Barenbrug |
| D643,346 S | 8/2011 | Barenbrug |
| D643,786 S | 8/2011 | Barenbrug |
| 8,033,555 B2 | 10/2011 | Mostert et al. |
| 8,056,975 B2 | 11/2011 | Longenecker et al. |
| 8,061,732 B2 | 11/2011 | Song et al. |
| 8,087,680 B2 | 1/2012 | Dotsey et al. |
| 8,087,688 B2 | 1/2012 | Gilbertson et al. |
| 8,092,111 B2 | 1/2012 | Wu |
| 8,100,429 B2 | 1/2012 | Longenecker et al. |
| 8,157,273 B2 | 4/2012 | Bar-Lev |
| 8,162,025 B2 | 4/2012 | Motosko et al. |
| 8,172,243 B2 | 5/2012 | Dresher |
| 8,172,253 B2 | 5/2012 | Song |
| 8,186,705 B2 | 5/2012 | Greger et al. |
| 8,205,906 B2 | 6/2012 | Kretschmer et al. |
| 8,205,907 B2 | 6/2012 | Chicca |
| 8,220,118 B2 | 7/2012 | Buckingham et al. |
| 8,226,110 B2 | 7/2012 | Liao |
| 8,226,111 B2 | 7/2012 | Valdez et al. |
| 8,231,136 B2 | 7/2012 | Fiore, Jr. |
| 8,240,700 B2 | 8/2012 | Greger et al. |
| 8,251,382 B2 | 8/2012 | Chen et al. |
| 8,262,103 B2 | 9/2012 | Enserink et al. |
| 8,276,935 B2 | 10/2012 | Minato et al. |
| 8,282,120 B2 | 10/2012 | Minato et al. |
| 8,291,555 B2 | 10/2012 | Buckingham et al. |
| 8,313,115 B2 | 11/2012 | Cheng |
| 8,316,999 B2 | 11/2012 | Solinski et al. |
| 8,322,744 B2 | 12/2012 | Ahnert et al. |
| 8,366,127 B2 | 2/2013 | Zhong et al. |
| 8,371,606 B2 | 2/2013 | Gower et al. |
| 8,376,375 B2 | 2/2013 | Mival et al. |
| 8,382,127 B2 | 2/2013 | Longenecker et al. |
| 8,382,150 B2 | 2/2013 | Williams et al. |
| 8,388,254 B2 | 3/2013 | Huang |
| 8,393,679 B2 | 3/2013 | Longenecker et al. |
| 8,398,096 B2 | 3/2013 | Gower et al. |
| 8,398,111 B2 | 3/2013 | Mival et al. |
| 8,398,143 B1 | 3/2013 | Haley |
| 8,414,012 B2 | 4/2013 | Chen et al. |
| 8,418,816 B2 | 4/2013 | Chen |
| 8,444,170 B2 | 5/2013 | Chen et al. |
| 8,448,977 B2 | 5/2013 | Grintz et al. |
| D683,974 S | 6/2013 | Leys et al. |
| 8,458,880 B2 | 6/2013 | Fiore, Jr. |
| 8,459,665 B2 | 6/2013 | Sellers et al. |
| 8,474,836 B2 | 7/2013 | Yang et al. |
| 8,474,854 B2 | 7/2013 | Dean et al. |
| 8,485,546 B2 | 7/2013 | Li et al. |
| 8,490,757 B2 | 7/2013 | Chen et al. |
| 8,491,000 B2 | 7/2013 | Yeh et al. |
| 8,505,956 B2 | 8/2013 | Hartenstine et al. |
| 8,517,412 B2 | 8/2013 | Tsai et al. |
| 8,550,489 B2 | 10/2013 | Valdez et al. |
| 8,556,780 B2 | 10/2013 | Chen |
| 8,567,311 B2 | 10/2013 | Kraus |
| 8,567,866 B2 | 10/2013 | Carimati Di Carimate et al. |
| 8,585,063 B2 | 11/2013 | Chen |
| 8,585,075 B2 | 11/2013 | Zhong |
| 8,590,919 B2 | 11/2013 | Yi |
| 8,596,669 B2 | 12/2013 | Liao |
| 8,596,670 B2 | 12/2013 | di Carimate et al. |
| 8,602,442 B2 | 12/2013 | Li |
| 8,608,190 B2 | 12/2013 | Mountz |
| 8,616,638 B2 | 12/2013 | Zeng et al. |
| 8,635,743 B2 | 1/2014 | Smith et al. |
| D699,633 S | 2/2014 | Kobayashi et al. |
| 8,646,158 B2 | 2/2014 | Buckingham et al. |
| 8,651,502 B2 | 2/2014 | Winterhalter et al. |
| 8,657,308 B2 | 2/2014 | Gower et al. |
| 8,657,311 B2 | 2/2014 | Li |
| 8,662,516 B1 | 3/2014 | Slagerman |
| 8,672,341 B2 | 3/2014 | Offord |
| 8,678,498 B2 | 3/2014 | Heisey |
| 8,696,015 B2 | 4/2014 | Karremans et al. |
| 8,702,118 B2 | 4/2014 | Gower et al. |
| 8,708,364 B2 | 4/2014 | Gower et al. |
| 8,713,765 B2 | 5/2014 | Buckingham et al. |
| 8,714,581 B2 | 5/2014 | Fritz et al. |
| 8,720,936 B1 | 5/2014 | Lai |
| 8,764,048 B1 | 7/2014 | Eren et al. |
| 8,777,253 B2 | 7/2014 | Minato et al. |
| 8,789,662 B2 | 7/2014 | Childs et al. |
| 8,827,283 B2 | 9/2014 | Homan et al. |
| 8,840,132 B2 | 9/2014 | Gower et al. |
| 8,844,964 B2 | 9/2014 | Chiang |
| 8,851,505 B2 | 10/2014 | Van Gelderen et al. |
| 8,864,166 B2 | 10/2014 | Longenecker et al. |
| D716,705 S | 11/2014 | Holefleisch |
| 8,876,147 B2 | 11/2014 | Chicca |
| 8,882,134 B2 | 11/2014 | Rolicki et al. |
| 8,899,614 B2 | 12/2014 | Smith |
| 8,899,615 B2 | 12/2014 | Dijkstra |
| 8,905,427 B2 | 12/2014 | Katz et al. |
| 8,905,428 B2 | 12/2014 | Schroeder et al. |
| 8,919,806 B2 | 12/2014 | Pollack et al. |
| 8,919,807 B2 | 12/2014 | Taylor et al. |
| 8,936,261 B2 | 1/2015 | Yuan |
| 8,955,856 B2 | 2/2015 | Guo |
| 8,955,868 B2 | 2/2015 | Haut et al. |
| 8,955,869 B2 | 2/2015 | Zehfuss |
| 8,960,734 B2 | 2/2015 | Camp |
| 8,961,057 B2 | 2/2015 | Schroeder |
| 8,973,217 B2 | 3/2015 | Weichbrodt |
| 8,985,616 B1 | 3/2015 | Chen |
| 8,991,838 B2 | 3/2015 | Li et al. |
| 8,991,853 B2 | 3/2015 | Li et al. |
| 8,991,854 B2 | 3/2015 | Greger et al. |
| 8,997,948 B2 | 4/2015 | Li et al. |
| 9,010,773 B2 | 4/2015 | Horst et al. |
| 9,044,104 B2 | 6/2015 | Smith |
| 9,050,993 B2 | 6/2015 | Pollack |
| 9,067,613 B2 | 6/2015 | Yi et al. |
| 9,085,312 B2 | 7/2015 | Liu |
| 9,090,125 B2 | 7/2015 | Block et al. |
| 9,108,658 B2 | 8/2015 | Spencer et al. |
| 9,108,659 B2 | 8/2015 | Spading |
| 9,139,044 B1 | 9/2015 | Tsai |
| 9,150,236 B2 | 10/2015 | Zhang |
| 9,174,662 B2 | 11/2015 | Zhang |
| 9,193,370 B2 | 11/2015 | Henry |
| 9,193,373 B2 | 11/2015 | Fjelland et al. |
| 9,205,855 B2 | 12/2015 | Gower et al. |
| 9,216,755 B2 | 12/2015 | Eisinger |
| 9,260,127 B2 | 2/2016 | Rolicki et al. |
| 9,260,128 B2 | 2/2016 | Liu |
| D756,852 S | 5/2016 | Barenbrug |
| 9,327,752 B2 | 5/2016 | Jane Santamaria |
| 9,399,477 B2 | 7/2016 | Iftinca et al. |
| 9,403,449 B2 | 8/2016 | Longenecker et al. |
| 9,403,549 B2 | 8/2016 | Driessen |
| 9,403,550 B2 | 8/2016 | Zehfuss |
| 9,415,790 B2 | 8/2016 | Driessen |
| 9,428,208 B1 | 8/2016 | Chen |
| 9,463,822 B2 | 10/2016 | Sundberg et al. |
| 9,481,206 B2 | 11/2016 | Block et al. |
| 9,493,178 B2 | 11/2016 | Smith et al. |
| 9,517,786 B2 | 12/2016 | Chang et al. |
| 9,517,789 B2 | 12/2016 | Pacella et al. |
| 9,522,615 B2 | 12/2016 | Longenecker et al. |
| 9,540,028 B2 | 1/2017 | Taylor et al. |
| 9,545,940 B2 | 1/2017 | Taylor et al. |
| 9,545,941 B2 | 1/2017 | Pacella et al. |
| 9,561,816 B2 | 2/2017 | Dowd et al. |
| 9,610,966 B2 | 4/2017 | Zhong |
| 9,630,642 B2 | 4/2017 | Zehfuss et al. |
| 9,637,153 B2 | 5/2017 | Sclare |

(56) References Cited

U.S. PATENT DOCUMENTS

| | | |
|---|---|---|
| 9,643,640 B2 | 5/2017 | Gower et al. |
| 9,701,332 B2 | 7/2017 | Zheng |
| 9,725,107 B2 | 8/2017 | Li |
| 9,776,652 B2 | 10/2017 | Zhong |
| 9,796,404 B2 | 10/2017 | Xu |
| 9,815,487 B2 | 11/2017 | Dowd et al. |
| 9,821,831 B2 | 11/2017 | Reaves et al. |
| 9,840,168 B2 | 12/2017 | Yi et al. |
| 9,849,903 B1 | 12/2017 | Lai |
| 9,862,401 B2 | 1/2018 | Wuerstl |
| 9,884,640 B2 | 2/2018 | Li |
| 9,887,640 B2 | 2/2018 | Li |
| 9,902,417 B2 | 2/2018 | Storm et al. |
| 9,908,551 B2 | 3/2018 | Ransil |
| 9,950,730 B2 | 4/2018 | Gao |
| 9,944,305 B2 | 5/2018 | Lee et al. |
| 9,962,011 B1 | 5/2018 | Eyman |
| 10,000,226 B2 | 6/2018 | Yi |
| 10,023,218 B2 | 7/2018 | Paxton et al. |
| 10,077,063 B2 | 9/2018 | Haut et al. |
| 10,144,442 B2 | 12/2018 | Ransil |
| 10,150,496 B2 | 12/2018 | Oakes |
| 10,155,528 B2 | 12/2018 | Zhong et al. |
| 10,239,550 B2 | 3/2019 | Ruggiero et al. |
| 10,414,423 B2 | 9/2019 | Zhong |
| 10,442,453 B2 | 10/2019 | Haut et al. |
| 10,449,987 B2 | 10/2019 | Gibson |
| 10,556,610 B2 | 2/2020 | Rolicki et al. |
| 2002/0041082 A1 | 4/2002 | Perego |
| 2003/0094791 A1 | 5/2003 | Hartenstine et al. |
| 2004/0090046 A1 | 5/2004 | Hartenstine et al. |
| 2005/0150053 A1 | 7/2005 | Hartenstine |
| 2005/0167951 A1 | 8/2005 | Zhen |
| 2005/0225056 A1 | 10/2005 | Dotsey et al. |
| 2005/0242548 A1 | 11/2005 | Hutchinson et al. |
| 2005/0264064 A1 | 12/2005 | Hei et al. |
| 2007/0013167 A1 | 1/2007 | Henry |
| 2007/0031224 A1 | 2/2007 | Lutz |
| 2007/0045975 A1 | 3/2007 | Yang |
| 2007/0085303 A1 | 4/2007 | Cheng |
| 2007/0108710 A1 | 5/2007 | Pennisi et al. |
| 2007/0126195 A1 | 6/2007 | Dresher |
| 2007/0187914 A1 | 8/2007 | Santamaria |
| 2007/0241524 A1 | 10/2007 | Dotsey et al. |
| 2008/0079240 A1 | 4/2008 | Yeh |
| 2008/0093825 A1 | 4/2008 | Yang |
| 2008/0211206 A1 | 9/2008 | Thorne et al. |
| 2008/0224450 A1 | 9/2008 | Van der Vegt |
| 2008/0231023 A1 | 9/2008 | Yang |
| 2009/0194973 A1 | 8/2009 | Wang |
| 2009/0206566 A1 | 8/2009 | Enserink et al. |
| 2009/0295128 A1 | 12/2009 | Nagelski et al. |
| 2009/0315299 A1 | 12/2009 | Barenbrug |
| 2010/0038887 A1 | 2/2010 | Bar-Lev |
| 2010/0052277 A1 | 3/2010 | Zehfuss |
| 2010/0109293 A1 | 5/2010 | Friisdahl et al. |
| 2010/0127480 A1 | 5/2010 | Ahnert et al. |
| 2010/0140902 A1 | 6/2010 | Zehfuss |
| 2010/0230933 A1 | 9/2010 | Dean et al. |
| 2010/0237637 A1 | 9/2010 | Camp |
| 2011/0012324 A1 | 1/2011 | Yeh et al. |
| 2011/0062676 A1 | 3/2011 | Gower et al. |
| 2011/0148076 A1 | 6/2011 | Chen |
| 2011/0163519 A1 | 7/2011 | Van Gelderen et al. |
| 2011/0181024 A1 | 7/2011 | Chicca |
| 2011/0193325 A1 | 8/2011 | Li |
| 2011/0221169 A1 | 9/2011 | Karremans et al. |
| 2011/0266762 A1 | 11/2011 | Chen |
| 2011/0272925 A1 | 11/2011 | Dijkstra |
| 2011/0291388 A1 | 12/2011 | Sellers et al. |
| 2011/0291389 A1 | 12/2011 | Offord |
| 2011/0309658 A1 | 12/2011 | Carimati Di Carimate et al. |
| 2012/0242062 A1 | 9/2012 | Schroeder et al. |
| 2013/0113185 A1 | 5/2013 | Zehfuss |
| 2013/0153616 A1 | 6/2013 | Geva et al. |
| 2013/0154215 A1 | 6/2013 | Thomas et al. |
| 2013/0154322 A1 | 6/2013 | Gower et al. |
| 2013/0227817 A1 | 9/2013 | Block et al. |
| 2013/0270800 A1 | 10/2013 | Chiang |
| 2014/0044472 A1 | 2/2014 | Lin et al. |
| 2014/0054939 A1 | 2/2014 | Hu |
| 2014/0056638 A1 | 2/2014 | Wu et al. |
| 2014/0167393 A1 | 6/2014 | Tsai et al. |
| 2014/0183843 A1 | 7/2014 | Iftinca et al. |
| 2014/0191483 A1 | 7/2014 | Rolicki et al. |
| 2015/0021872 A1 | 1/2015 | Rolicki et al. |
| 2015/0042075 A1 | 2/2015 | Smith et al. |
| 2015/0074947 A1 | 3/2015 | Rezaei |
| 2015/0076774 A1 | 3/2015 | Sclare |
| 2015/0108738 A1 | 4/2015 | Pollack et al. |
| 2015/0136553 A1 | 5/2015 | Den Boer et al. |
| 2015/0152665 A1 | 6/2015 | Camp |
| 2015/0158334 A1 | 6/2015 | Hartenstine et al. |
| 2015/0197268 A1 | 7/2015 | Dowd et al. |
| 2015/0274188 A1 | 10/2015 | Li |
| 2015/0291200 A1 | 10/2015 | Taylor et al. |
| 2015/0375766 A1 | 12/2015 | Taylor et al. |
| 2016/0001804 A1 | 1/2016 | Pacella et al. |
| 2016/0046314 A1 | 2/2016 | Zehfuss et al. |
| 2016/0159385 A1 | 6/2016 | Rolicki et al. |
| 2016/0288814 A1 | 10/2016 | Li |
| 2016/0332655 A1 | 11/2016 | Reaves et al. |
| 2017/0021851 A1 | 1/2017 | Pujol |
| 2017/0144686 A1 | 5/2017 | Pujol et al. |
| 2017/0203779 A1 | 7/2017 | Gower et al. |
| 2017/0217471 A1 | 8/2017 | Haut et al. |
| 2017/0240197 A1 | 8/2017 | Oakes |
| 2017/0297600 A1 | 10/2017 | Zhong et al. |
| 2017/0313337 A1 | 11/2017 | Horst |
| 2018/0001950 A1 | 1/2018 | Allen |
| 2018/0029625 A1 | 2/2018 | Ruggiero et al. |
| 2018/0111636 A1 | 4/2018 | Gower et al. |
| 2019/0009811 A1 | 1/2019 | Haut et al. |
| 2019/0168794 A1 | 6/2019 | Eyman et al. |
| 2019/0256121 A1* | 8/2019 | Rolicki ............ B62B 7/142 |
| 2019/0256122 A1 | 8/2019 | Eyman et al. |

FOREIGN PATENT DOCUMENTS

| | | |
|---|---|---|
| CN | 201161604 | 10/2008 |
| CN | 201530404 | 7/2010 |
| CN | 101837799 | 9/2010 |
| CN | 201792891 | 4/2011 |
| CN | 104354750 | 2/2015 |
| CN | 205022654 | 2/2016 |
| CN | 205186242 | 4/2016 |
| CN | 205345000 | 6/2016 |
| DE | 3130163 | 2/1983 |
| DE | 10011588 | 1/2001 |
| DE | 202007011019 | 12/2007 |
| DE | 202010011566 | 11/2010 |
| EP | 0791500 | 8/1997 |
| EP | 1918155 | 5/2008 |
| EP | 1992543 | 11/2008 |
| EP | 2192022 | 6/2010 |
| EP | 2275321 | 1/2011 |
| EP | 2368784 | 9/2011 |
| EP | 2420429 | 2/2012 |
| EP | 2892790 | 7/2015 |
| EP | 2927090 | 10/2015 |
| FR | 2648102 | 12/1990 |
| GB | 2171299 | 8/1986 |
| GB | 2193692 | 2/1988 |
| GB | 2431140 | 4/2007 |
| JP | 2008030741 | 2/2008 |
| TW | M290119 U | 5/2006 |
| TW | M325960 U | 1/2008 |
| WO | 2008033014 | 3/2008 |
| WO | 2010047596 | 4/2010 |
| WO | 2014037177 | 3/2014 |
| WO | 2015109103 | 7/2015 |
| WO | 2018022889 | 2/2018 |

(56) References Cited

FOREIGN PATENT DOCUMENTS

| WO | 2018022893 | 2/2018 |
|---|---|---|
| WO | 2018022895 | 2/2018 |
| WO | 2019019097 | 1/2019 |

OTHER PUBLICATIONS

International Searching Authority, "International Search Report," issued in connection with International Application No. PCT/US2017/044190, dated Sep. 27, 2017, 3 pages.
International Searching Authority, "Written Opinion of the International Searching Authority," issued in connection with International Application No. PCT/US2017/044190, dated Sep. 27, 2017, 7 pages.
International Searching Authority, "International Search Report," issued in connection with International Application No. PCT/US2017/044192, dated Oct. 24, 2017, 3 pages.
International Searching Authority, "Written Opinion of the International Searching Authority," issued in connection with International Application No. PCT/US2017/044192, dated Oct. 24, 2017, 11 pages.
International Search Authority, "International Search Report," issued in connection with International Application No. PCT/US2017/044183, dated Oct. 24, 2017, 3 pages.
International Search Authority, "Written Opinion of the International Searching Authority," issued in connection with International Application No. PCT/US2017/044183, dated Oct. 24, 2017, 9 pages.
International Bureau, "International Preliminary Report on Patentability," dated Jan. 29, 2019 in connection with application No. PCT/US2017/044183, 10 pages.
International Bureau, "International Preliminary Report on Patentability," dated Jan. 29, 2019 in connection with application No. PCT/US2017/044192, 12 pages.
International Bureau, "International Preliminary Report on Patentability," dated Jan. 29, 2019 in connection with application No. PCT/US2017/044190, 8 pages.
International Bureau of WIPO, "International Preliminary Report on Patentability," issued in connection with International Patent Application No. PCT/CN2017/094679, dated Jan. 28, 2020, 5 pages.
European Patent Office, "Extended European Search Report," issued in connection with European Patent Application No. 17835275.3, dated Mar. 13, 2020, 8 pages.
European Patent Office, "Extended European Search Report," issued in connection with application No. 17835273.8, dated Mar. 13, 2020, 9 pages.
The International Bureau, "International Preliminary Report on Patentability," issued in connection with International Patent Application No. PCT/US2017/044183, dated Jan. 29, 2019, 10 pages.
United States Patent and Trademark Office, "Non-Final Office Action," issued in connection with U.S. Appl. No. 16/320,914, dated Aug. 21, 2020, 9 pages.
United States Patent and Trademark Office, "Non-Final Office Action," issued in connection with U.S. Appl. No. 16/320,913, dated Sep. 4, 2020, 5 pages.
China National Intellectual Property Administration, "Office Action," issued in connection with Chinese Patent Application No. 201780056227, dated Nov. 4, 2020, 19 pages (includes English translation).
China National Intellectual Property Administration, "Office Action," issued in connection with Chinese Patent Application No. 201780056364, dated Nov. 17, 2020, 8 pages.
United States and Patent and Trademark Office, "Notice of Allowance," issued in connection with U.S. Appl. No. 16/320,910, dated Nov. 25, 2020, 8 pages.
European Patent Office, "Extended European Search Report," issued in connection with European Patent Application No. 17919214.1 dated Jun. 2, 2020, 7 pages.
United States Patent and Trademark Office, "Office Action," issued in connection with U.S. Appl. No. 16/320,910, dated Jun. 19, 2020, 14 pages.
United States Patent and Trademark Office, "Notice of Allowance," issued in connection with U.S. Appl. No. 16/320,913, dated Dec. 30, 2020, 5 pages.
Chinese Patent Office, "Office Action," issued in connection with Chiense Patent Application No. 201780056235.4, dated Dec. 30, 2020, 23 pages (includes English translation).
United States Patent and Trademark Office, "Notice of Allowance," issued in connection with U.S. Appl. No. 16/320,914, dated Mar. 10, 2021, 5 pages.

\* cited by examiner

FOLDABLE STROLLERS AND RELATED METHODS

FIELD OF THE DISCLOSURE

This disclosure relates generally to strollers and, more particularly, to foldable strollers and related methods.

BACKGROUND

Known strollers include a frame to support one or more seats and/or accessories (e.g., a basket). The frames of some known strollers folds to, for example, reduce a footprint of the strollers when the strollers are not in use.

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
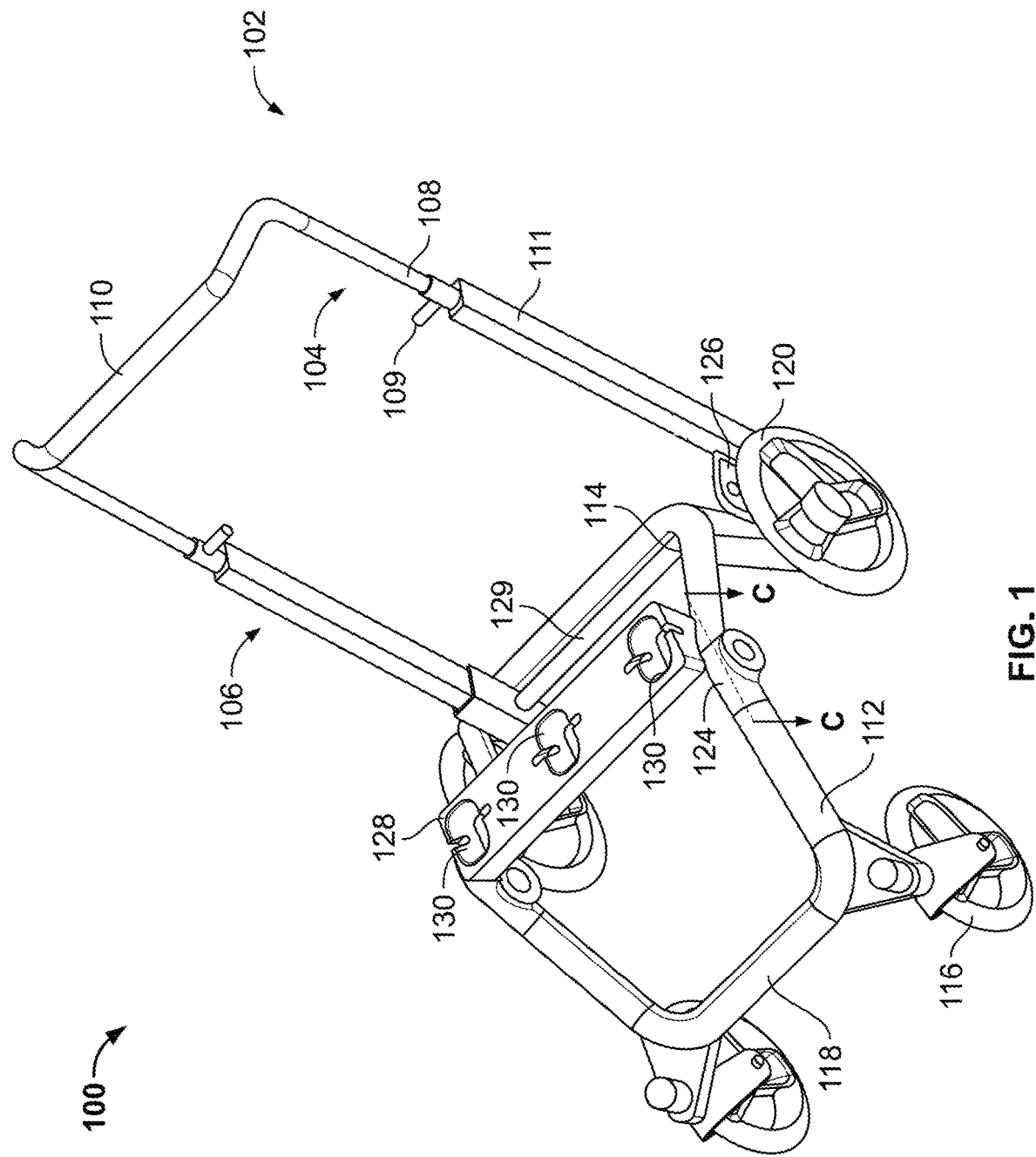
FIG. 1 is a right, front perspective view of an example stroller having a foldable frame in accordance with the teachings of this disclosure, the frame in an extended position.

Strollers typically include a frame and a seat supported by the frame to receive a child occupant. The frame of a stroller typically includes legs, wheels coupled to the legs, and a handle that enables a user (e.g., a caregiver) to push the stroller. In some examples, an accessory, such as a basket, is also supported by the frame.

When the stroller is not being used to carry a child, the user may wish to fold the frame of the stroller for storage purposes, to reduce a size of the stroller in crowded areas such as a restaurant, to fit the stroller in a vehicle such as a car to transport the stroller, etc. Often times the user is caring for the child while folding the stroller frame. Thus, the user typically wishes to quickly fold the stroller frame without needing to perform multiple and/or physically demanding steps to fold the stroller frame.

Disclosed herein are example strollers including a foldable frame that moves from an expanded or use position to a collapsed or stored position when not in use. In disclosed examples, a handle of the frame can be activated by a user to cause a remainder of the frame to fold or collapse, thereby providing for efficient folding of the frame. In some examples disclosed herein, the frame is folded after seat(s) and/or accessories have been uncoupled from the stroller frame. Thus, example stroller disclosed herein provide for compact storage of the stroller frame.

Some example stroller frames disclosed herein include a handle coupled to a handle hub disposed proximate to a rear leg of the stroller (e.g., a leg that supports a rear wheel of the stroller). The handle hub is operatively coupled to a joint disposed between the rear leg of the stroller and a front leg of the stroller (e.g., a leg that supports a front wheel of the stroller). In some disclosed examples, the handle hub is operatively coupled to the joint via cable. In some disclosed examples, when the user pushes on the handle, the handle folds at the handle hub relative to the rear leg. During folding of the handle, the handle hub pulls on the cable, which enables or causes the stroller frame to fold at the joint coupling the front leg and the rear leg. Thus, example strollers disclosed herein provide for substantial folding of the stroller frame via the stroller handle. Further, example strollers disclosed herein provide for efficient and convenient folding and storage of the stroller frame.

An example frame for use with a stroller is disclosed herein. The example frame includes a first leg, a second leg, a first joint to couple the first leg and the second leg, a handle arm, and a second joint to couple the handle arm and the first leg. The second joint includes a first portion having a pocket and a second portion including a lock slidably disposed in the second portion. The lock is to be removably coupled to the pocket. The handle arm is to rotate relative to the first leg via the second joint when the lock is removed from the pocket. The rotation of the handle via the second joint is to enable the second leg to rotate relative to the first leg via the first joint to fold the frame.

In some examples, the lock includes a first pin and the frame further includes a lever disposed in the second portion, the handle arm to cause to lever to rotate to release the first pin from the pocket. Some such examples further include a cable disposed in the second portion. The cable includes a first end coupled to the lever and a second end coupled to the lock. The rotation of the lever is to remove the pin from the pocket via the cable. Some other such examples further include a second pin disposed in the second portion, the second pin disposed proximate to the lever. In some such examples, an end of the handle arm is to engage the second pin to cause the lever to rotate. Some such examples further include a spring coupled to the second pin.

In some examples, the frame further includes a router disposed in the second portion and a cable extending between the router and the first joint. In some such examples, the frame further includes a lock disposed in the first joint, wherein the rotation of the handle arm is to cause the cable to pull the lock to enable the second leg to rotate.

In some examples, the first portion is spaced part from the second portion during rotation of the handle arm.

Another example frame for use with a stroller is disclosed herein. The example frame includes a first frame member having a first wheel coupled thereto, a second frame member having a second wheel coupled thereto, a third frame member, a first joint to couple the first frame member and the second frame member, the first joint including a lock; and a second joint to couple the second frame member and the third frame member, the second joint operatively coupled to the first joint. The second joint includes a pocket, a coupler to be removably received in the pocket when the coupler is in a first position, and a lever. The third frame member is to operatively cause the lever to rotate. The rotation of the lever is to cause the coupler to move from the first position to a second position in which the coupler is removed from the pocket. The third frame member is to rotate via the second joint when the coupler is removed from the pocket to release the lock to enable the first frame member to move from an extended position to a collapsed position to fold the frame.

In some examples, the frame further includes a cable extending from the second joint to the lock. The cable is to displace the lock during rotation of the third frame member.

In some examples, the frame further includes a plate disposed in the second joint, the plate including a router, the cable to be at least partially wound about the router, the third frame member to pivot about the plate.

In some examples, the lock is a first lock and the coupler includes a second lock, the third frame member to slide relative to the second joint to release the second lock to enable the third frame member to rotate. In some such examples, the second lock is coupled to the lever via a cable. In some such examples, a spring is coupled to the second lock.

Another example frame for use with a stroller is disclosed herein. The example frame includes a first leg, a second leg, a first joint to couple the first leg and the second leg, a handle arm, and a second joint to couple the handle arm and the first leg. The second joint includes a release portion, a locking portion, and means for removably coupling the release portion and the locking portion, wherein the handle arm is to operatively uncouple the release portion from the locking portion, the handle arm to rotate relative to the first leg via the second joint when the release portion is uncoupled from the locking portion, the rotation of the handle via the second joint to enable the second leg to rotate relative to the first leg via the first joint to fold the frame.

In some examples, the means for removably coupling the release portion to the locking portion includes a protrusion disposed on end of the release portion, the protrusion to be received in a pocket of the locking portion. In some such examples, the protrusion includes means for locking the protrusion to the locking portion. In some such examples, the means for locking includes a lock pin. Some such examples further include a lever disposed in the release portion, the lever operatively coupled to the lock pin, the handle arm to engage the lever to cause the release portion to uncouple from the lock portion via the lock pin.

Turning to the figures, FIG. 1 is a right, front perspective view of example stroller 100 constructed in accordance with the teachings of this disclosure. For illustrative purposes, the example stroller 100 is shown without seat(s) and/or accessories coupled thereto. The example stroller 100 includes a frame 102 having a first side 104 and a second side 106. The first side 104 and the second side 106 of the stroller frame 102 include a plurality of frame members and wheels attached to the frame members. The frame members and wheels of the first side 104 of the stroller frame 102 will be described herein with the understanding that the second side 106 is a mirror image of the first side 104. Thus, the second side 106 includes substantially identical frame members and wheels as the first side 104 and, in the interest of brevity, will not be repeatedly detailed herein.

In the illustrated example stroller 100, the first side 104 includes an arm 108 extending from a parent handle 110. The parent handle 110 is disposed between the first side 104 and the second side 106 of the stroller frame 102. In some examples, the arm 108 and the parent handle 110 are integrally formed from a unit such as, for example, a tube.

In the example of FIG. 1, a height of the parent handle 110 is adjustable via adjustment of a height of the arm 108. In some examples, the arm 108 is at least partially disposed in a housing 111 such that the arm 108 slides relative to the housing 111 to adjust the height of the handle 110. The example arm 108 of FIG. 1 includes a handle lock 109. The handle lock 109 can include a lever having a tab that engages one of a plurality of notches formed in the arm 108 to lock the handle 110 at a desired height relative to a surface on which the stroller frame 102 rests. As disclosed herein, in some examples, the lock 109 is released by the user to allow the user to push down on the handle 110 (e.g., toward the ground surface) as part of folding the frame 102 of the stroller 100.

The first side 104 of the stroller frame 102 also includes a front leg 112 and a rear leg 114. A front wheel 116 is rotatably coupled to the front leg 112. In some examples, the front wheel 116 is rotatably coupled to a front bar 118 that extends between the first side 104 and the second side 106. A rear wheel 120 is rotatably coupled to the rear leg 114. In some examples, a rear wheel 120 is coupled to a rear axle that extends between the first side 104 and the second side 106. Although the example stroller 100 of FIG. 1 includes four wheels (e.g., two front wheels 116 and two rear wheels 120 coupled to the first and second sides 104, 106 of the stroller frame 102), different numbers of front and/or rear wheels are used in other examples (e.g., a single front wheel).

In the illustrated example, the front leg 112 and the rear leg 114 are coupled via a seat hub or a joint 124. The rear leg 114 and the arm 108 are coupled via a first example handle hub 126 (e.g., a joint). As disclosed herein, the joint 124 and the first example handle hub 126 facilitate folding of the stroller frame 102 such that front leg 112 and the arm 108 and, thus, the parent handle 110 are free to rotate relative to the rear leg 114.

In the example of FIG. 1, a tube 129 extends between the first example handle hub 126 of the first side 104 and the first example handle hub 126 of the second side. In some examples, the tube 129 is rotatably coupled to the handle hub(s) 126. As disclosed herein, the rotating tube 129 facilitates folding of the respective arm(s) 108 of the first and second sides 104, 106 via the first example handle hub(s) 126. In particular, in the example of FIG. 1, the arm(s) 108 pivot about the tube 129 via the first example handle hub 126.

The example stroller 100 of FIG. 1 includes a mount bar 128. The example mount bar 128 includes a plurality of receivers 130. In the example of FIG. 1, one or more seats and/or accessories can be removably coupled to the stroller frame 102 by inserting the seat and/or accessory in one of the receivers 130 of the mount bar 128. The seat(s) and/or accessories can be locked to a respective receiver 130 via lock(s) provided on the seat or the accessory that are received in opening(s) defined in each receiver 130. The seat(s) and/or accessories can be selectively removed from the receiver(s) 130 via user control of the lock(s) on the seat(s) or the accessories.

FIGS. 2-5 illustrate an example handle hub or joint (e.g., the handle hub 126 of FIG. 1) to facilitate folding of the arm(s) 108 and the handle 110 of the example stroller 100 of FIG. 1.

Figure 2:
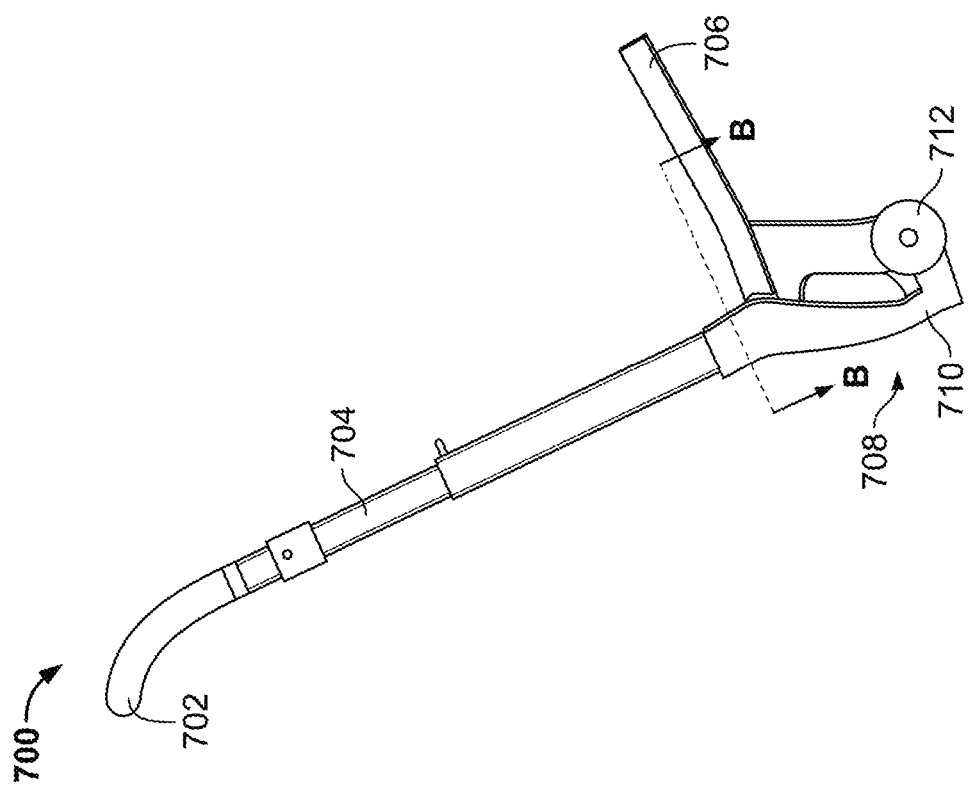
FIG. 2 is a left side view of an example handle hub for coupling a handle arm and a rear leg that may be used with the example stroller of FIG. 1 in accordance with the teachings of this disclosure.

FIG. 2 is a partial side view of an example stroller frame 700 including a handle bar 702, an arm 704 coupled to the handle, and a rear leg 706. The example stroller frame 700 may be used with the example stroller 100 of FIG. 1. For illustrative purposes, the example rear wheel, the example front leg, the example joint coupling the example rear leg 706 and the example front leg, and the example front wheel are not shown in FIG. 2. The example rear wheel, the example front leg, the example joint, and the example front wheel can be the same or substantially the same as the rear wheel 120, the front leg 112, the joint 124, and the front wheel 116 of FIG. 1. Also, while FIG. 2 shows a first side of the example stroller frame 700, the second side of the example stroller frame 700 includes substantially identical frame members as the first side and, in the interest of brevity, will not be repeatedly detailed herein.

In the example of FIG. 2, an example handle hub 708 (e.g., a joint, corresponding to the handle hub 126 of FIG. 1) couples the example arm 704 and the example rear leg 706. The example handle hub 708 includes a release portion 710 and a locking portion 712. As disclosed herein, the release portion 710 is removably coupled to the locking portion 712. The release portion 710 uncouples from the locking portion 712 during folding of the example stroller frame 700.

Figure 3:
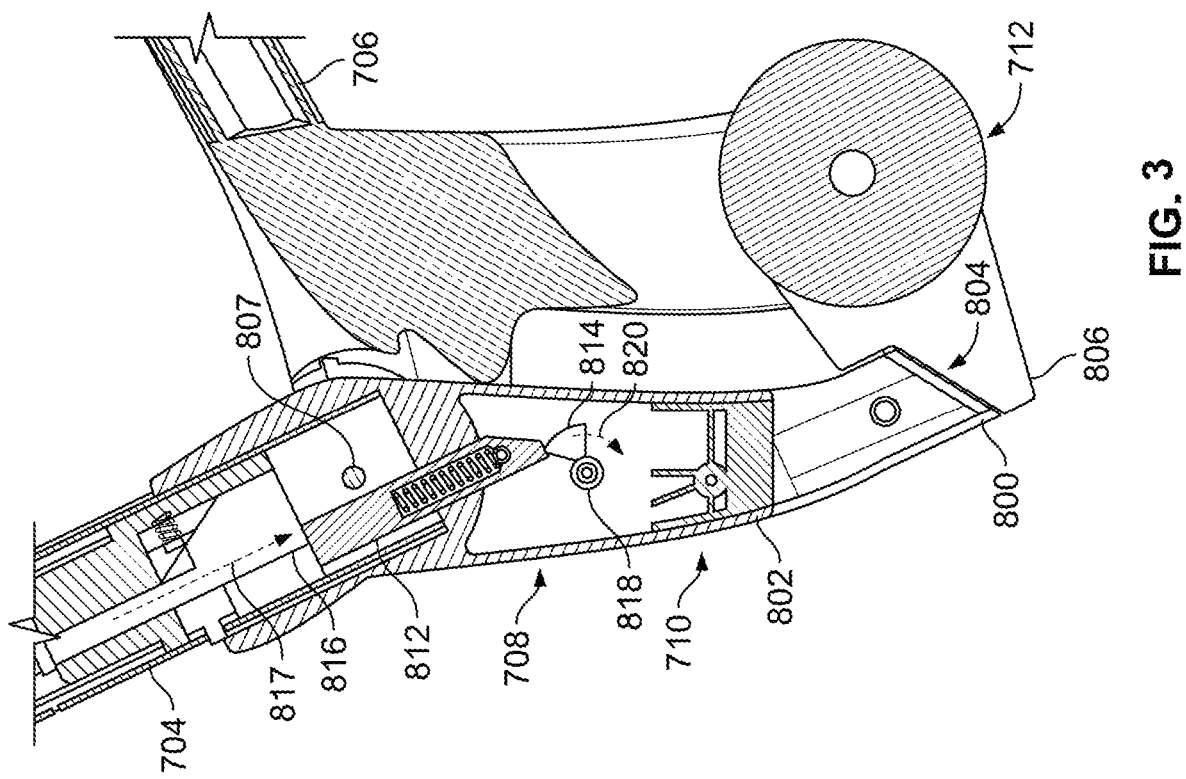
FIGS. 3-5 are cross-sectional views of the example handle hub of FIG. 2 taken along the B-B line of FIG. 2, showing the handle arm in different positions.

FIG. 3 is a first cross-sectional view of the example handle hub 708 taken along the B-B line of FIG. 2. The example release portion 710 of the example handle hub 708 includes means for removably coupling the release portion 710 to the locking portion 712. For example, the release portion 710 of FIG. 2 includes a coupler 800 (e.g., a protrusion) formed from a housing 802 of the release portion 710. At least a portion of the example coupler 800 is disposed in a pocket 804 defined by a housing 806 of the locking portion 712 of the example handle hub 708 of FIGS. 2 and 3. In the example of FIG. 3, when the coupler 800 of the release portion 710 is unlocked from the pocket 804 of the locking portion 712, the arm 704 rotates about a pivot plate 807 disposed in the housing 802 of the release portion 710.

The example housing 802 of the release portion 710 of the example handle hub 708 includes means for driving the uncoupling of the release portion 710 from the locking portion 712. For example, the release portion 710 of FIG. 2 includes a spring-loaded trigger pin 812. The release portion 710 includes a lever 814 disposed proximate to the spring-loaded trigger pin 812. The example arm 704 of the stroller frame 700 includes a foot 816. When the user pushes down on the handle 702, the arm 704 moves (e.g., slides) downward, as represented by the arrow 817 of FIG. 3. As a result, the foot 816 engages the spring-loaded trigger pin 812, as illustrated in FIG. 3. The engagement of the foot 816 with the trigger pin 812 causes the trigger pin 812 to press down on the lever 814, which causes the lever to rotate about a lever pivot point 818, as represented by the arrow 820 of FIG. 3.

Figure 4:
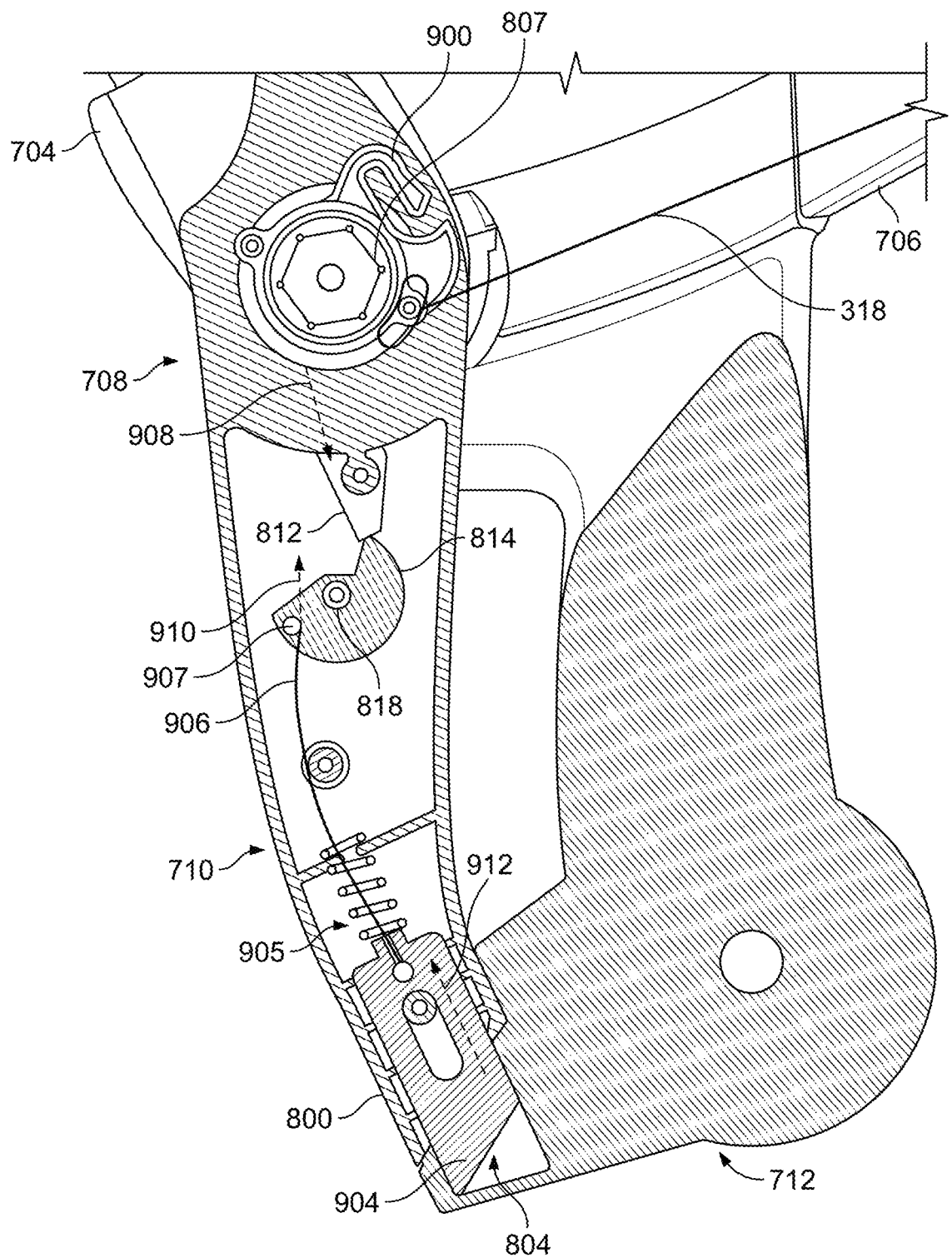

FIG. 4 is a second cross-sectional view of the example handle hub 708 taken along the B-B line of FIG. 2. In particular, FIG. 4 shows the pivot plate 807 about which the arm 704 rotates. In some examples, the pivot plate 807 is coupled to the tube 129 of the example stroller frame 102 of FIG. 1 to transfer rotational motion to the tube 129 (e.g., the tube 129 extends between respective example handle hubs 708 of the first and second sides of the frame 700 of FIG. 2 as substantially disclosed in connection with the frame 102 of FIG. 1). As shown in FIG. 4, the pivot plate 807 includes a router 900 about which a cable 318 (e.g., a first cable) is at least partially wound. The cable 318 extends from the router 900 to the joint coupling the rear leg 706 to a front leg of the example stroller frame 700 (e.g., the joint 124 of FIG. 1).

As illustrated in FIG. 4, the example coupler 800 of the example handle hub 708 includes means for locking the release portion 710 to the locking portion 712. For example, the coupler 800 of FIG. 4 includes a spring-loaded lock pin 904 disposed in a pin housing 905 of the release portion 710. When the release portion 710 of the example handle hub 708 is coupled to the locking portion 712, the lock pin 904 prevents uncoupling between the coupler 800 of the release portion 710 and the pocket 804 of the locking portion 712. In the example of FIG. 4, the lock pin 904 is coupled to the lever 814 via a second cable 906. For example, the second cable 906 is coupled to a cable connector 907 (e.g., an opening) of the lever 814. When the foot 816 of the arm 704 pushes on the trigger pin 812 (as represented by the arrow 908 of FIG. 4), the lever 814 rotates about the lever pivot point 818. As a result, the lever 814 pulls the second cable 906 upward (e.g., away from a floor or ground surface), or in the direction of the arrow 910 of FIG. 4. The pulling of the second cable 906 pulls the lock pin 904 of the coupler 800 from the pocket 804 of the locking portion 712 in the direction of the arrow 912 of FIG. 4 to release the release portion 710 from the locking portion 712 and to enable the arm 704 to be rotated.

Figure 5:
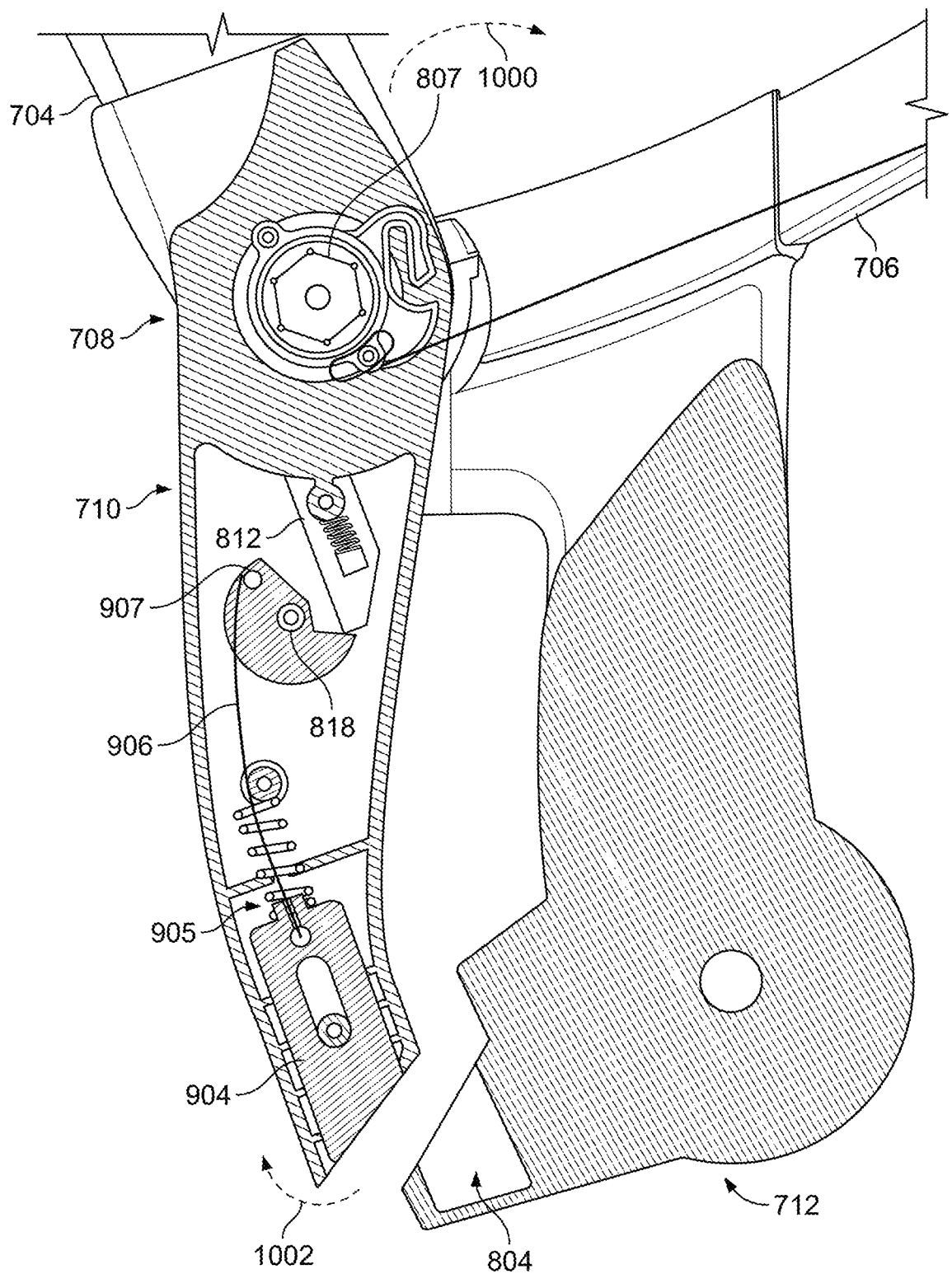

FIG. 5 illustrates the uncoupling of the release portion 710 of the example handle hub 708 of FIGS. 2-4 from the locking portion 712. As illustrated in FIG. 5, the rotation of the lever 814 about the lever pivot point 818 unlocks the lock pin 904 via the pulling of the second cable 906. For example, the cable connector 907 moves from a first position shown in FIG. 4 to a second position shown in FIG. 5 during rotation of the lever 814 about the lever pivot point 818. As a result, the second cable 906 coupled to the lever 814 pulls on the lock pin 904. Put another away, as a result of the pulling of the second cable 906 by the lever 814, the lock pin 904 moves further into the pin housing 905 and out of the pocket 804 of the locking portion 712 of the example handle hub 708.

When the spring-loaded lock pin 904 is removed from the pocket 804 of the locking portion 712, the arm 704 can be rotated about the pivot plate 807 (and the tube 129 of FIG. 1), as represented by the arrow 1000 of FIG. 5. The release portion 710 moves away from the lock portion 712 as the arm 704 rotates about the pivot plate 807 toward the rear leg 706, as represented by the arrow 1002 of FIG. 5. As the user continues to rotate the arm 704 about the pivot plate 807, the arm 704 moves proximate to the rear leg 706.

Thus, the example handle hub 708 of FIGS. 2-5 provide for folding the handle 110, 702 of the example stroller frame 102, 700. The handle hubs 126, 708 enable the arm(s) 108, 704 of the stroller frame 102, 700 rotate toward the rear leg(s) 114, 706 and, thus, cause the handle 110, 702 to fold relative to a position of the handle 110, 702 when the stroller 100 is in use. In some examples, the mount bar 128 of the stroller 100 includes means for securing the arm(s) 108, 704 to secure the arm(s) 108, 704 in the folded position and maintain the compact storage size of the folded frame 102, 700.

Figure 6:
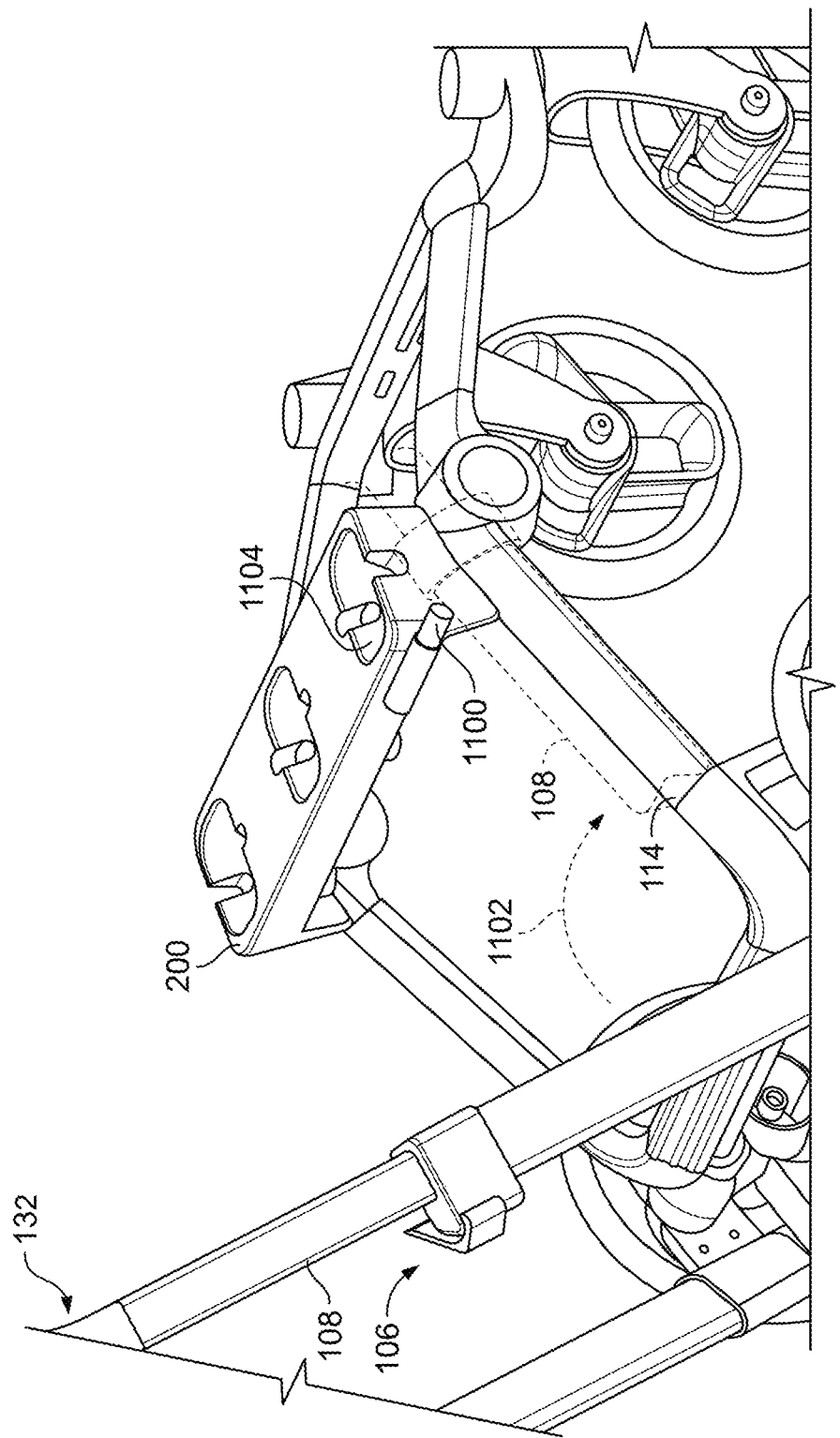
FIG. 6 is a left, rear perspective view of the example stroller of FIG. 1 including a storage pin in accordance with the teachings of this disclosure.

FIG. 6 is a left, rear perspective view of the example stroller 100 of FIG. 1 including the mount bar 128 and the arm(s) 108. The example mount bar 128 of FIG. 11 includes a storage pin 1100 or other means for securing the arm(s) 108. Although the example storage pin 1100 is shown in FIG. 6 on the second side 106 of the example stroller 100, in some examples, a storage pin 1100 is additionally or alternatively disposed on the mount bar 128 at the first side 104 (e.g., to secure the arm 108 of the first side 104 in the folded position). For brevity, the storage pin 1100 will be discussed in connection with the arm 108 of the second side 106 of the stroller 100 but equally applies to the arm 704 of the stroller frame 700 of FIGS. 2-5.

As represented by the arrow 1102 of FIG. 6, the arm 108 moves toward the rear leg 114 of the example stroller frame 102 when the release portion 710 is uncoupled from the locking portion 712 of the first example handle hub 126. In some examples, the arm 108 is substantially parallel to the rear leg 114 when the arm 108 is pivoted about the pivot plate 807 and the tube 129 of the handle hub 126, 708.

The example storage pin 1100 is a spring-loaded pin that extends from an opening 1104 defined in the mount bar 128. In some examples, when the user folds the arm 108, the user moves the arm 108 such that the storage pin 1100 retracts as the arm 108 pass the storage pin 1100 (e.g., the arm 108 pushes the storage pin 1100 inward relative to the opening 1104). In such examples, the storage pin 1100 automatically extends after the arm 108 has passed the storage pin 1110 such that the arm 108 is located (e.g., sits) below the storage pin 1100 when the arm 108 is in the folded position, as represented by the dashed outline of the arm 108 in FIG. 6. Thus, the storage pin 1100 secures (e.g., holds) the arm 108 in the folded position. As disclosed herein, when the user wishes to unfold the example stroller, the user presses the storage pin 1100 inward relative to the opening 1104 to release the arm 108 from being held by the storage pin 1100.

As disclosed above, the example handle hub 708 includes the pivot plate 807 having a router 900 about which a cable 318 is wound. In the examples of FIGS. 2-5, the cable 318 extends from the pivot plate 807 through a housing of the rear leg 114, 706 to the joint 124 of the example stroller frame 102, 700 coupling the respective rear leg 114, 706 to the front leg 112. In particular, the cable 318 is coupled to a pin disposed in the joint 124. In examples disclosed herein, the folding of the arm 108, 704 forming the handle 110, 702 causes the cable 318 to pull on the pin of the joint 124 and release the locking of the joint 124 to enable the front leg 112 to fold relative to the rear leg 114, 706.

Figure 7:
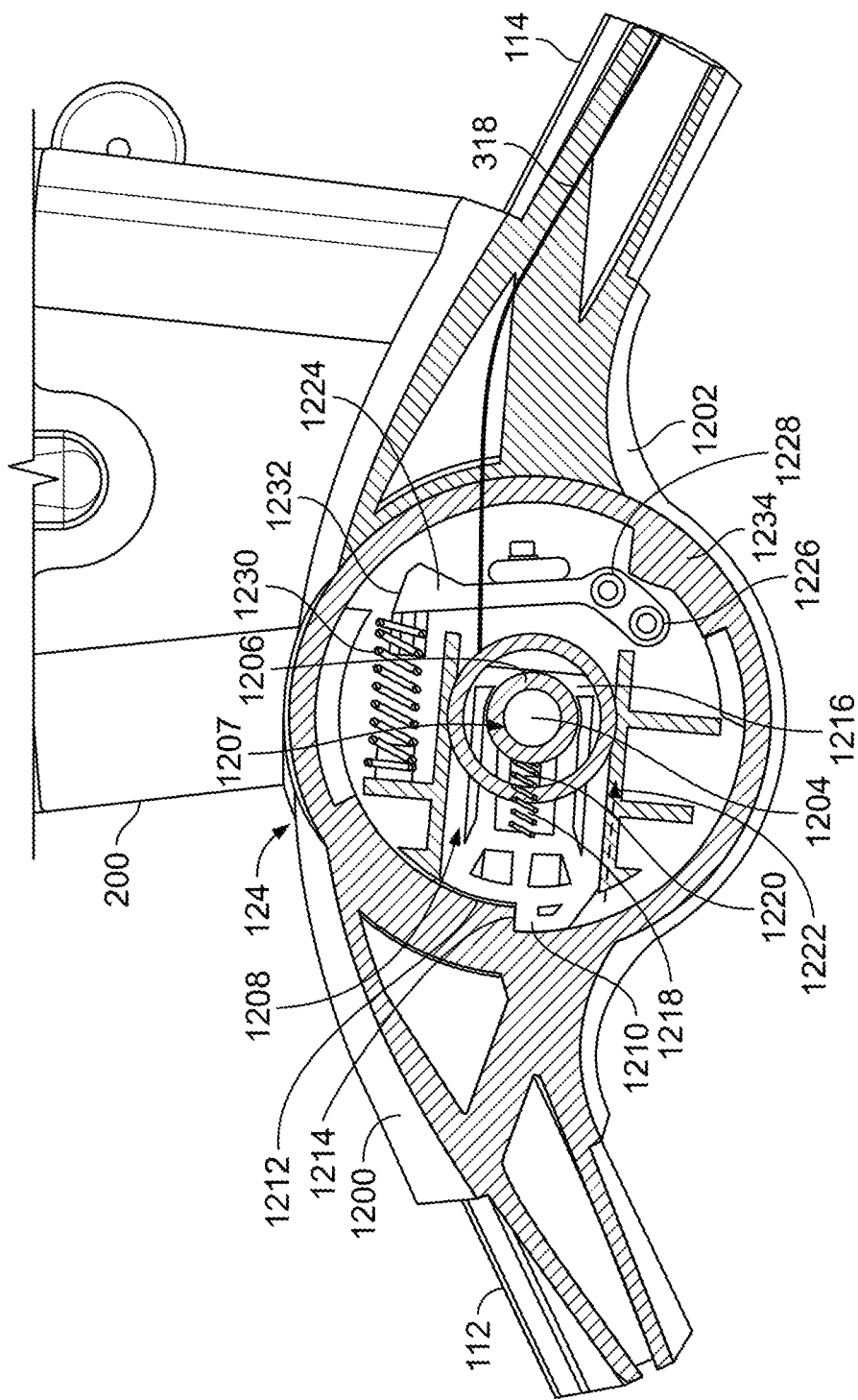
FIG. 7 is a cross-sectional view of an example joint for coupling the rear leg to a front leg of the example stroller of FIG. 1 in accordance with the teachings of this disclosure, taken along the C-C line of FIG. 1.

FIG. 7 is a cross-sectional view of the joint 124 of the example stroller 100 of FIG. 1 taken along the C-C line of FIG. 1. As disclosed above, the example joint 124 couples the rear leg 114, 706 and the front leg 112 of the example stroller frame 102, 700 of FIGS. 1-6. For illustrative purposes, the handle arm 108, 704 is not shown in FIG. 12. However, as disclosed above, the arm 108, 704 is disposed proximate to the rear leg 114 during folding of the front leg 112 (e.g., FIG. 6).

The example joint 124 of FIG. 7 includes a first housing 1200 coupled to the front leg 112 and a second housing 1202 coupled to the rear leg 114. The first housing 1200 and the second housing 1202 are rotatably coupled to one another such that the first housing 1200 can rotate relative to the second housing 1202 and, thus, the front leg 112 can rotate relative to the rear leg 114. For example, a diameter of the first housing 1200 may be less than a diameter of the second housing 1202 such that the first housing 1200 is received in the second housing 1202 and rotate relative to the second housing 1202 or vice versa. In some examples, the second housing 1202 includes an axle 1204 disposed therein and the first housing 1200 includes a receiver 1206 having an opening 1207 to receive the axle 1204 to rotatably couple the first and second housings 1200, 1202.

The first example housing 1200 includes means for locking the front leg 112 in an extended position when the stroller 100 is in use. For example, the first housing 1200 includes a lock pin 1208 disposed therein. When the example stroller 100 is in the expanded or use position, the lock pin 1208 prevents front leg 112 from folding (e.g., the lock pin 1208 holds the front leg 112 in the extended position shown in FIG. 1). When the example stroller 100 is in the expanded or use position, a protrusion 1210 formed at a first end 1212 of the lock pin 1208 engages a pin stop 1214 defined by the first housing 1200 of joint 124. The engagement between the protrusion 1210 and the pin stop 1214 prevents the front leg 112 from rotating relative to the rear leg 114 via the housings 1200, 1202.

As disclosed above, a cable 318 extends from the pivot plate 807 of the handle hub 126, 708 through the rear leg 114, 706. In the example of FIG. 7, an end of the cable 318 is coupled to a second end 1216 of the lock pin 1208 (e.g., coupled to an opening formed in the second end 1216 of the lock pin 1208). Thus, the cable 318 extends between the router 900 of the handle hub 126, 708 and the lock pin 1208 of the joint 124 via the rear leg 114, 706.

Figure 12:
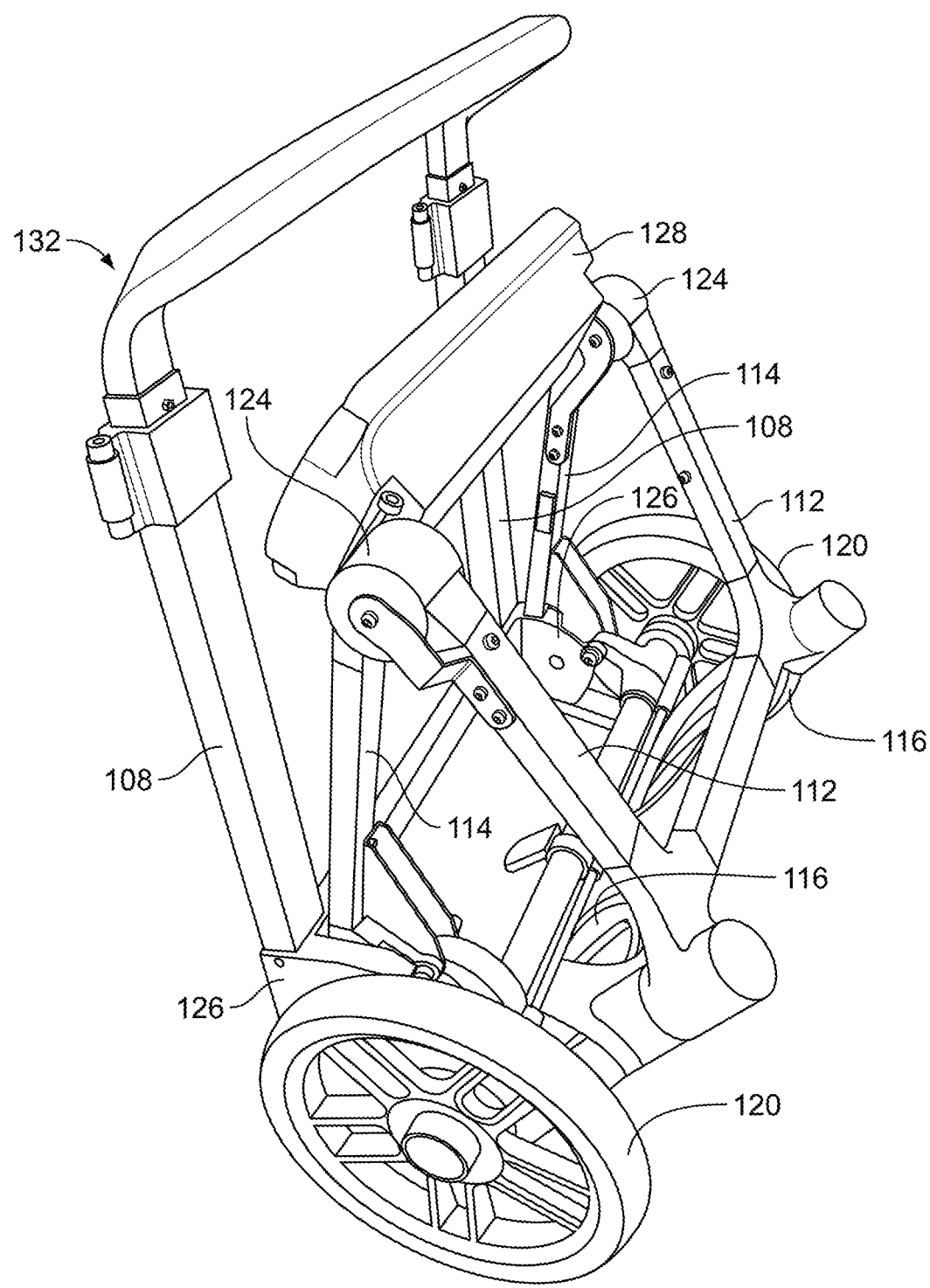
FIG. 12 is a left, front perspective view of the example stroller frame of FIG. 1 in a folded position.

The example lock pin 1208 of FIG. 12 includes means for driving the locking pin. For example, the lock pin 1208 is spring-loaded via a first spring 1218. In the example of FIG. 7, the first spring 1218 is disposed about a shaft 1220 formed in the lock pin 1208. In the example of FIG. 7, the first spring 1218 is in an extended position when the protrusion 1210 engages the pin stop 1214.

As disclosed herein, when the handle arm 108, 704 folds via the example handle hub 708 of FIGS. 2-5, the handle hub 126, 708 pulls on the cable 318 (e.g., via the router 900 of pivot plate 807 about which the cable 318 is wound during rotation of the arm 108, 704 about the pivot plate 807 and rotation of the tube 129 coupled to the pivot plate 807). In the example of FIG. 7, folding of the arm 108, 704 causes the cable 318 to pull the protrusion 1210 of the lock pin 1208 away from the pin stop 1214 against the force of the spring 1218 (e.g., due to increased tension on the cable 318 during folding of the arm 108, 704 at the handle hub 126, 708), as represented by the arrow 1222 of FIG. 7. When the protrusion 1210 clears the pin stop 1214, the first housing 1200 is rotatable relative to the second housing 1202.

The example joint 124 of FIG. 7 includes means for securing the first leg 112 in a folded position. For example, the joint 124 includes a detent arm 1224 disposed in the first housing 1200. The detent arm 1224 is pivotably coupled to the first housing 1200 via one or more fasteners 1226 disposed at a first end 1228 of the detent arm 1224. The example joint 124 includes means for driving the detent arm 1224. For example, the detent arm 1224 is spring-loaded via a second spring 1230 disposed in the first housing 1200. The second spring 1230 engages a second end 1232 of the detent arm 1224. When the stroller 100 is in the expanded or use position, the second spring 1230 is in an extended position and the detent arm 1224 is in a resting position. The first housing 1200 defines a ledge portion 1234 disposed proximate to the detent arm 1224. As disclosed herein, during rotation of the first housing 1200, the ledge portion 1234 engages or interferes with at least a portion of the detent arm 1224. The engagement between the detent arm 1224 and the ledge portion 1234 of the first housing 1200 facilitates the securing of the front leg 112 in the folded position via the detent arm 1224, as disclosed in more detail below.

Figure 8:
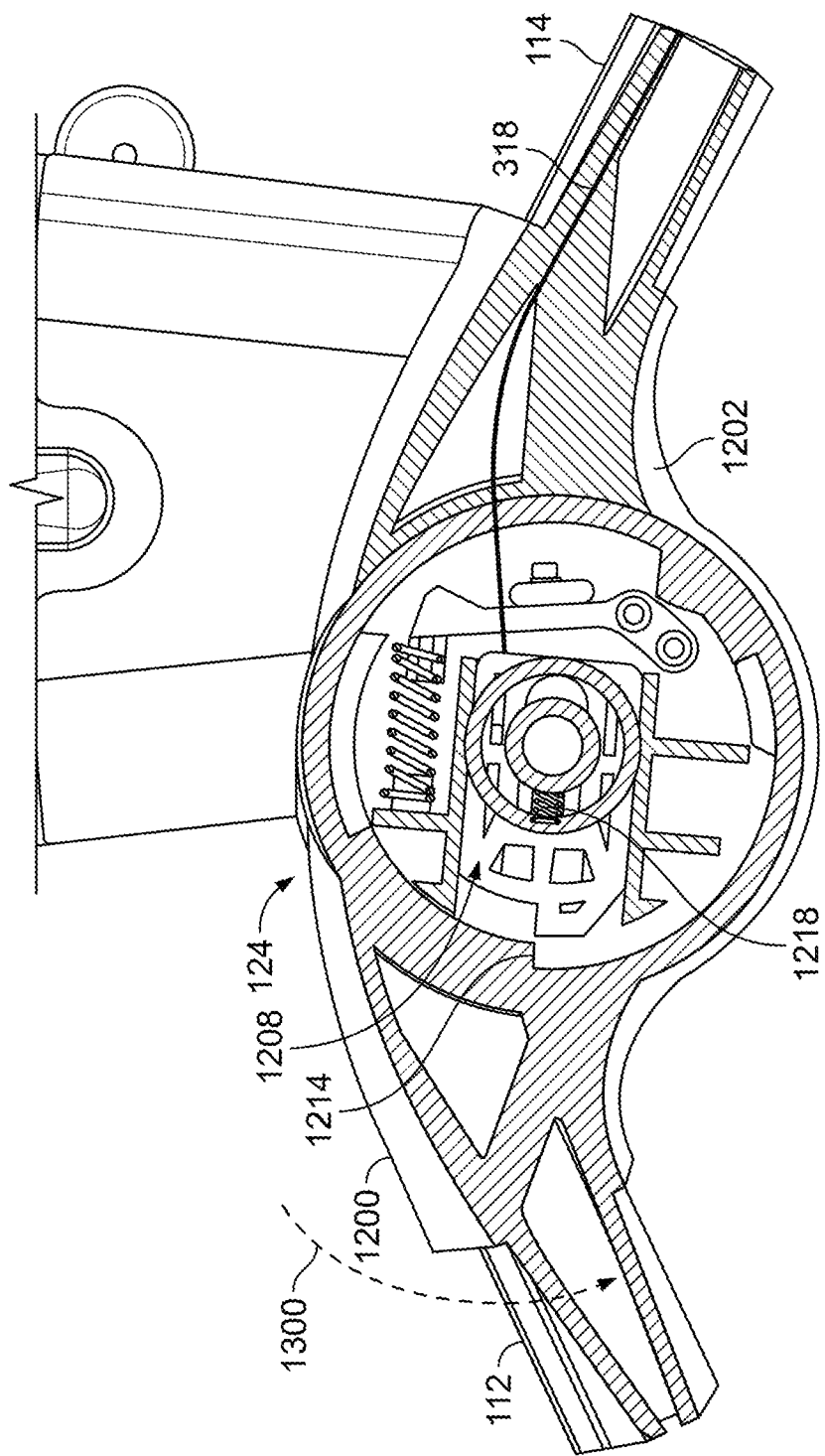
FIGS. 8-11 are cross-sectional views of the example joint of FIG. 7, showing the front leg in different positions.

FIG. 8 illustrates the removal of the protrusion 1210 of the lock pin 1208 from the pin stop 1214 of the example joint 124 of FIG. 12. As shown in FIG. 8, the first spring 1218 is compressed relative to the position of the first spring 1218 when the protrusion 1210 engages the pin stop 1214 shown in FIG. 7 due to the pulling by the cable 318 on the lock pin 1208 during folding of the arm 108, 704 about the handle hub 126, 708.

When the protrusion 1210 of the example locking pin 1208 is displaced relative to the pin stop 1214, the first housing 1200 is free to rotate relative to the second housing 1202 and, thus, the front leg 112 is free to rotate or fold relative to the rear leg 114, as represented by the arrow 1300 of FIG. 8. For example, the user can pivot (e.g., tip) the stroller frame 102, 700 onto the rear wheel(s) 120 as if to lift the front wheel(s) 116 of the stroller 100. As a result, the folded handle arm 108, 704 and the rear leg 114 move to a substantially vertical position relative to the surface on which the stroller frame 102 rests. Because the lock pin 1208 is released relative to the pin stop 1214, the front leg 112 folds or collapses relative to the rear leg 114 when the stroller frame 102 is pivoted on the rear wheel(s) 120 (rather than remaining extended as the front leg 112 would if the stroller 100 were lifted on the rear wheel 120 when the lock pin 1208 is engaged with the pin stop 1214). In some examples, the user guides or pushes the front leg 112 in the direction of the arrow 1300 of FIG. 8 during folding of the stroller frame 102.

Figure 9:
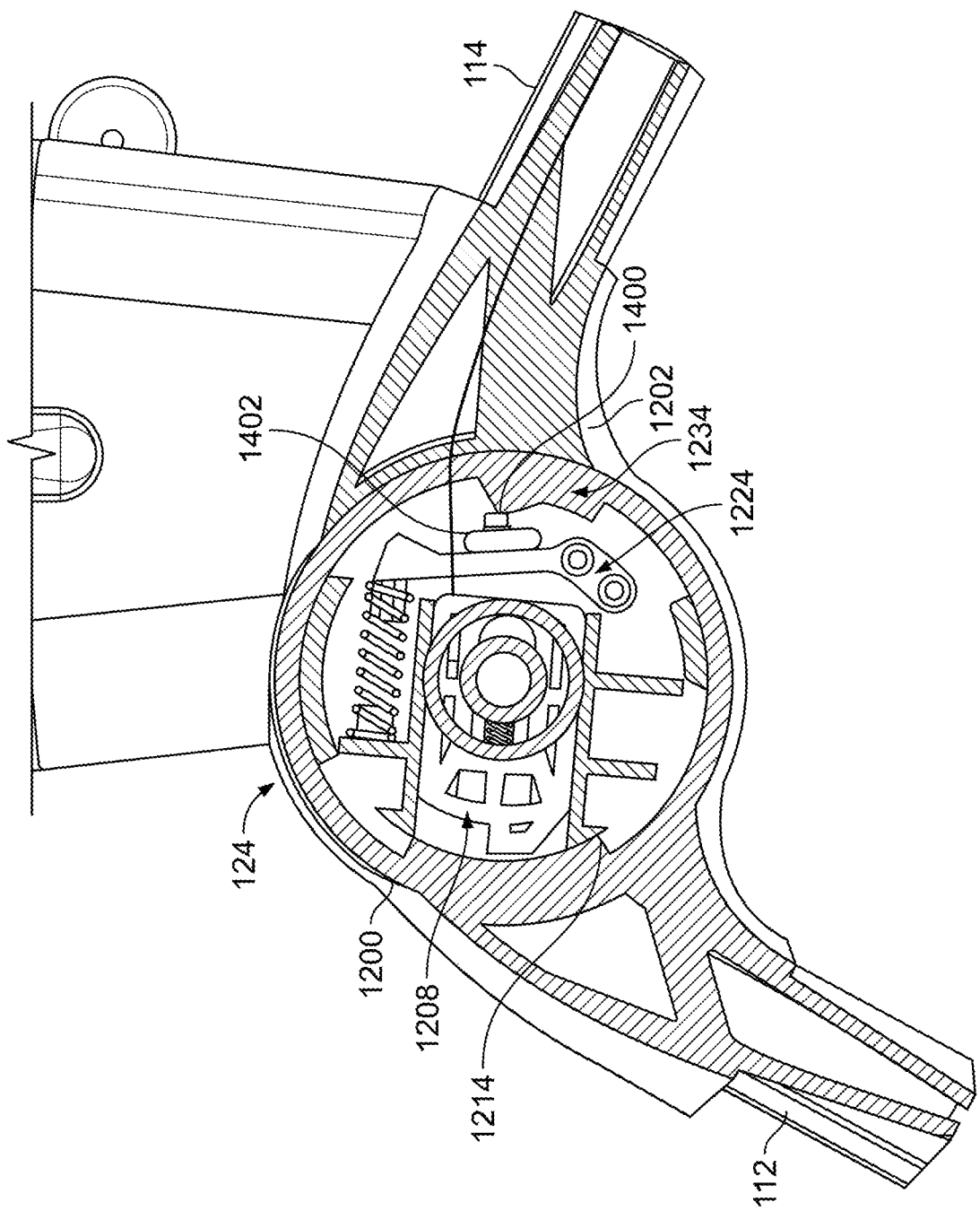

FIG. 9 illustrates the folding of the front leg 112 via rotation of the first housing 1200 relative to the second housing 1202 of the example joint 124 of FIGS. 7 and 8. As illustrated in FIG. 9, the portion of the first housing 1200 including the pin stop 1214 rotates past the lock pin 1208.

As also illustrated in FIG. 9, the ledge portion 1234 of the first housing 1200 rotates relative to the detent arm 1224 during rotation of the first housing 1200. The example ledge portion 1234 of the first housing 1200 includes a protrusion 1400. In some examples, the protrusion 1400 of the ledge portion 1234 engages a clicker 1402 coupled to the detent arm 1224. The clicker 1402 provides audible feedback (e.g., a clicking noise) to the user as the user guides the front leg 112 to the folded position to inform the user that, for example, the front leg 112 can be folded further toward the rear leg 114.

Figure 10:
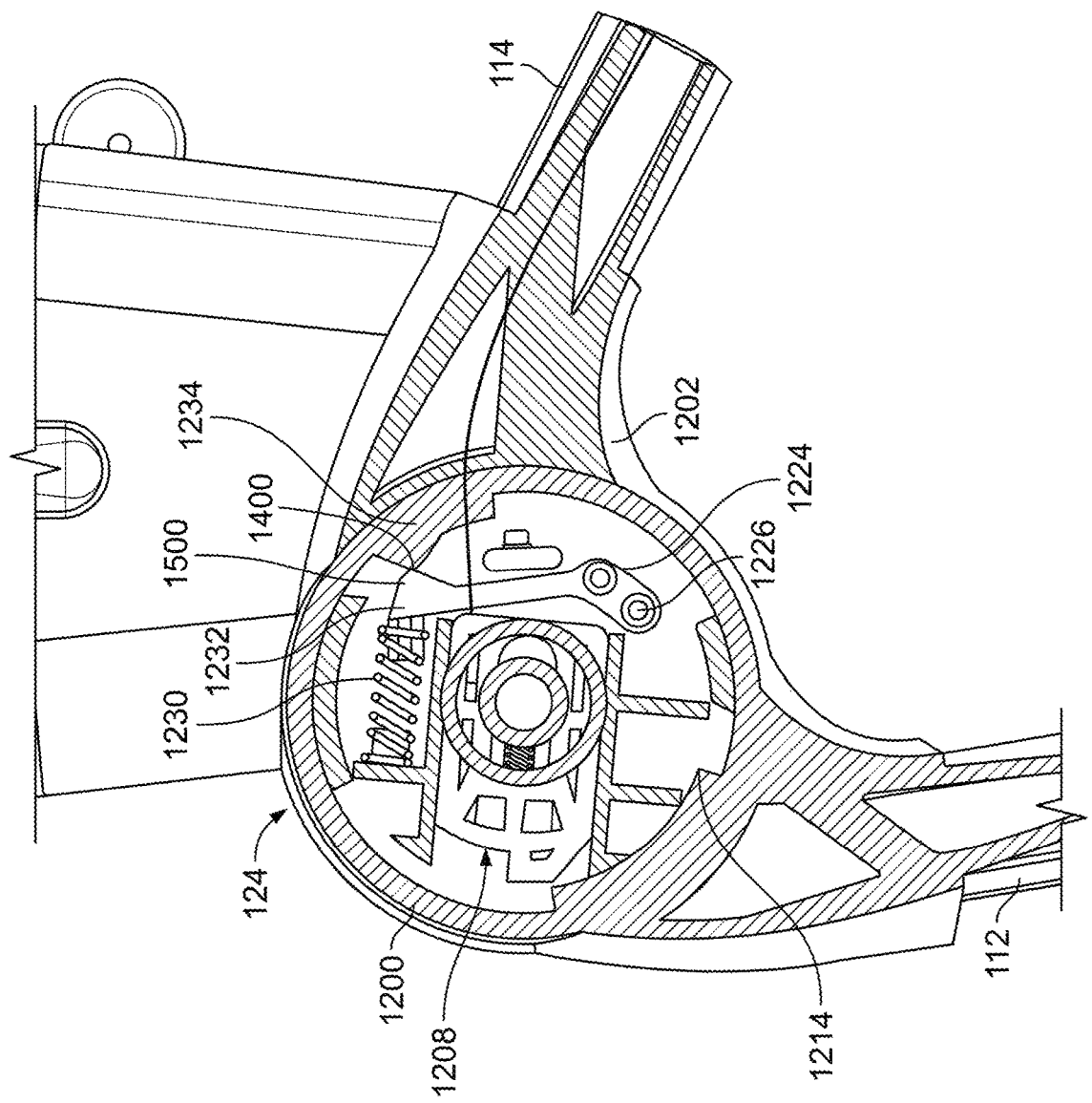

FIG. 10 illustrates the engagement of the ledge portion 1234 of the first housing 1200 with the second end 1232 of the detent arm 1224 during folding of the front leg 112 via the example joint 124. As illustrated in FIG. 10, the protrusion 1400 of the ledge portion 1234 engages a protrusion 1500 formed in the second end 1232 of the detent arm 1224. When the protrusion 1400 of the ledge portion 1234 engages the protrusion 1500 of the detent arm 1224, the protrusion 1400 pushes on the second end 1232 of the detent arm 1224, which causes the second spring 1230 associated with the detent arm 1224 to move to a compressed position (e.g., the second end 1232 of the detent arm 1224 pivots or deflects about the fastener 1226 at the first end 1228 of the detent arm 1224 as the protrusion 1400 pushes on the second end 1232). Thus, the detent arm 1224 moves to a deflected or non-rest position during folding of the front leg 112.

Figure 11:
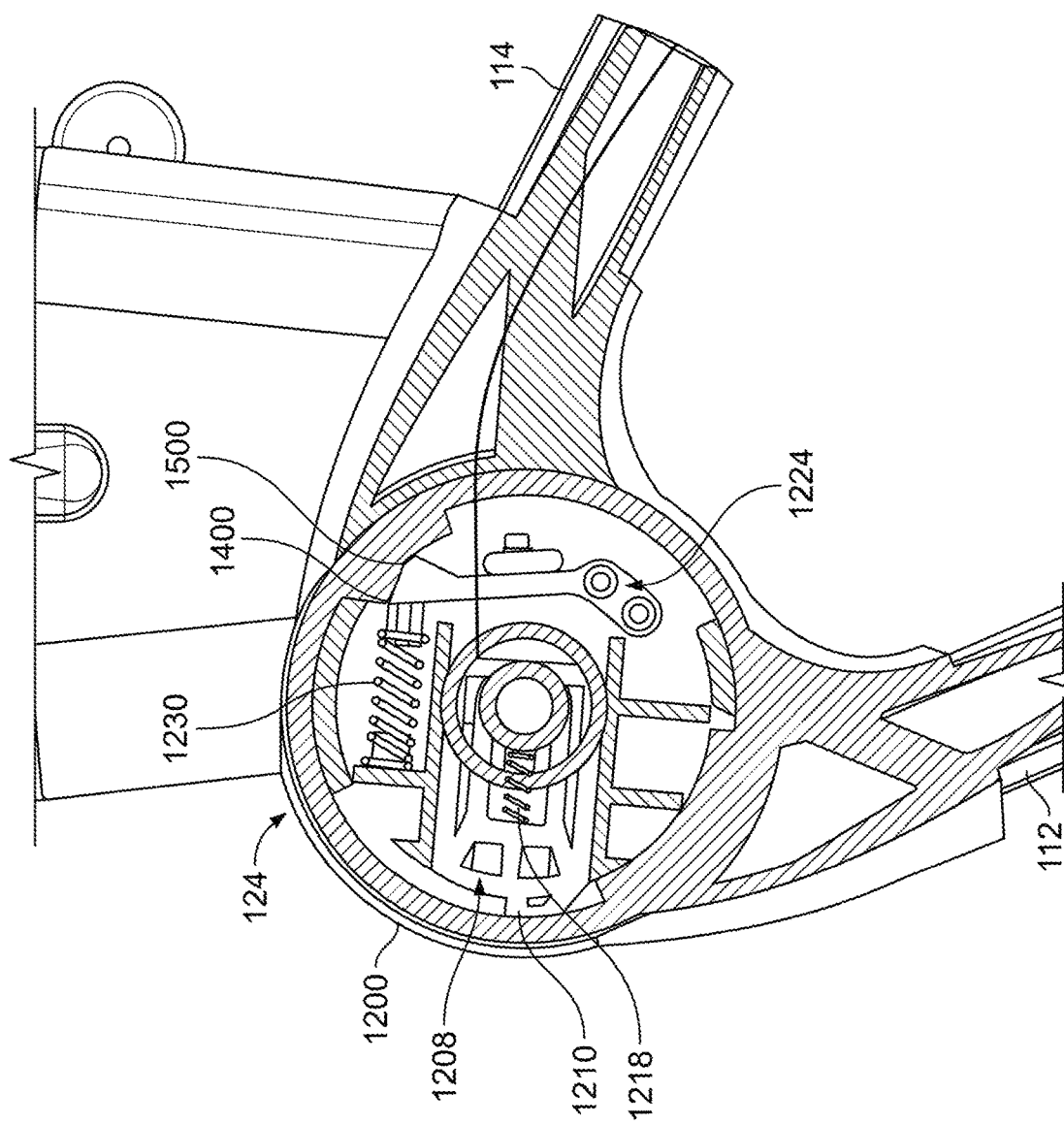

FIG. 11 illustrates the front leg 112 in a folded position via the example joint 124 of FIGS. 7-10. In the example of FIG. 11, the first housing 1200 is rotated relative to the second housing 1202 such that the protrusion 1400 of the ledge portion 1234 of the first housing 1200 has moved past the protrusion 1500 of the detent arm 1224. Put another way, the front leg 112 has moved substantially past an apex of the detent arm 1224. As a result, because the protrusion 1400 of the ledge portion 1234 is no longer pressing on the protrusion 1500 of the detent arm 1224, the second spring 1230 moves from the compressed position of FIG. 15 to the extended position. In the example of FIG. 11, as the detent arm 1224 returns to a rest position due to the extension of the second spring 1230, the detent arm 1224 generates an audible noise (e.g., a snapping sound) that indicates to the user that the front leg 112 is folded. In the example of FIG. 16, the detent arm 1224 holds the front leg 112 in the folded position when the ledge portion 1234 is in the position of FIG. 11.

When the first housing 1200 of the example joint 124 is rotated as shown in FIG. 11, the first spring 1218 of the lock pin 1208 returns to the extended position and the protrusion 1210 of the lock pin 1208 engages (e.g., re-engages) a surface of the first housing 1200. In some examples, the lock pin 1208 further assists to hold the front leg 112 in the folded position when the first housing 1200 is rotated as shown in FIG. 16. Thus, the example front leg 112 is folded relative to the rear leg 114 via the example joint 124 of FIGS. 7-11.

FIG. 12 is a left, front perspective view of the example stroller 100 of FIG. 1 showing the stroller frame 102 in a folded position, or a position in which the handle arm(s) 108 are folded relative to the rear leg(s) 114 and the front leg(s) 112 are folded relative to the rear leg(s) 114. As illustrated in FIG. 12, when the front leg 112 are in the folded position, the front wheel(s) 116 swivel relative to the seat mount 128 to further reduce a size of the folded stroller frame 102 (or, in some examples, are guided inward by the user during folding of the front leg(s) 112). For example, the front wheel(s) 116 swivel such that the wheel(s) 116 are substantially perpendicular to the rear wheel(s) 120. In some examples, the front wheel(s) 116 are held in the inwardly swiveled position by the detent arm 1224 of the example joint 124 (e.g., when the ledge portion 1234 is the position of FIG. 11).

As also illustrated in FIG. 12, when the example stroller frame 102 is in the folded position, the stroller frame 102 substantially rests on the rear wheels 120 and the handle hub 126 (e.g., the example handle hub 708 of FIGS. 2-7). In some examples, the handle hubs 126, 708 include feet or projections to facilitate stability of the example stroller frame 102 when in the folded position. The example stroller frame 102 provides for compact storage of the example stroller 100 when the stroller is not in use due to the folding of the frame 102 at the handle hubs 126, 708 and the joints 124. As disclosed above in connection with FIG. 6, in some examples, the arms 108 are held by the storage pin 1100 of the mount bar 128 such that a distance between a respective arm 108 and a respective rear leg 114 in the folded position is minimized when the arm 108 is in the folded position to further reduce a size of the folded stroller frame 102.

In some examples, the user wishes to move the stroller frame 102 from the folded position shown in FIG. 12 to the expanded or use position of FIG. 1. To unfold the example stroller frame 102, 700 the user pulls the front leg(s) 112 away from the rear leg(s) 114, 706. Referring to one of the sides 104, 106 of the example stroller frame 102, 700, as the front leg 112 moves from the collapsed position to the extended position, the first housing 1200 of the example joint 124 rotates in the opposite direction of rotation during folding of the front leg 112 (e.g., opposite the rotation of the first housing 1200 illustrated in FIGS. 7-11). As the first housing 1200 rotates during extension of the front leg 112, the ledge portion 1234 of the first housing 1200 moves past the detent arm 1224 of the example joint 124 (e.g., in the opposite direction shown in FIGS. 7-11). Also, as the first housing 1200 rotates during extension of the front leg 112, the portion of the first housing 1200 including the pin stop 1214 rotates so as to return the position in which the lock pin 1208 engages the pin stop 1214 (e.g., FIG. 7). The user pivots or swivels the front wheels outward, or in a direction of travel of the stroller 100.

In some examples, the user unlocks the handle arms 108 from the folded position by releasing the storage pin 1100 of FIG. 6 to allow the arm 108 to rotate away from the rear leg 114 (e.g., by pressing the storage pin 1100 inward relative to the opening 1104 of the mount bar 128). The user rotates the arm 108 away from the rear leg 114 until the release portion 710 engages the locking portion 712 of the handle hub 126, 708, thereby locking the stroller frame 102 in the extended position. The user can couple one or more seats and/or accessories to the example stroller frame 102 via the mount bar 128.

Figure 13:
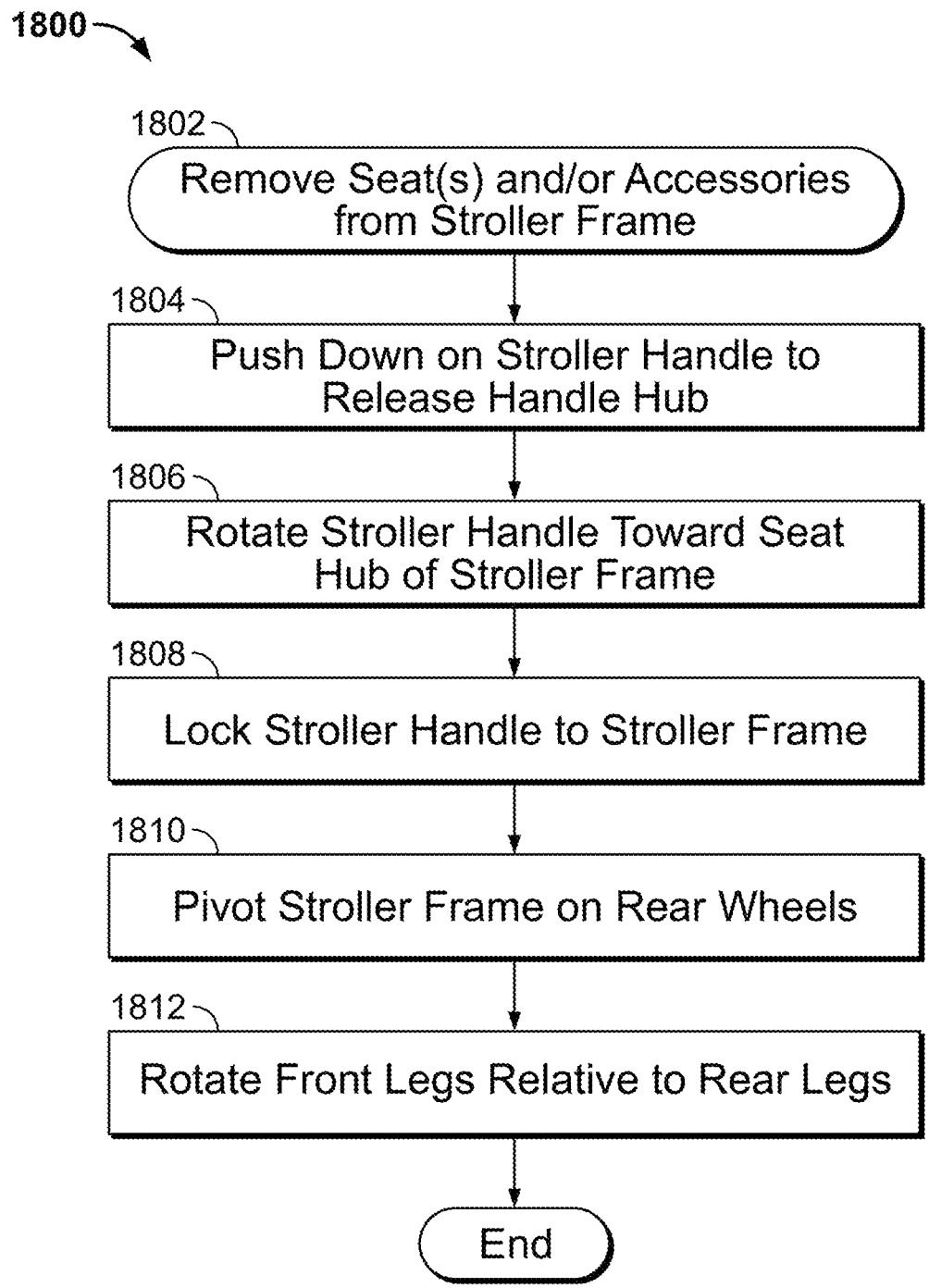
FIG. 13 is a flowchart representative of an example method disclosed herein for folding a stroller frame.

FIG. 13 is a flowchart illustrating an example process 1800 for folding a frame (e.g., the stroller frame 102, 700) of a stroller (e.g., the stroller 100). Although the example process 1800 is disclosed with respect to the flowchart illustrated in FIG. 13, many other methods of operating the example stroller frame 102, 700 may alternatively be used. For example, the order of execution of the blocks may be changed, and/or some of the blocks described may be changed, eliminated, or combined.

In the example of FIG. 13, one or more seats and/or accessories are removed from the stroller frame prior to folding the stroller frame (block 1802). For example, a user can uncouple the seat(s) and/or accessories from the mount bar 128 of the stroller frame 102 of FIG. 1.

The example process 1800 of FIG. 13 includes pushing down on a handle of the stroller frame to release a handle hub (block 1804). For example, the user can push down on the parent handle 110, 702 of the stroller frame 102. On each side of the stroller frame 102, the parent handle 110, 702 includes the arm 108, 704 and a handle hub 126, 708 that couples the arm 108, 704 to the rear leg 114, 706. In examples where the stroller frame 102, 700 includes the example handle hub of FIGS. 2-5, the foot 816 of the arm 704 engages the trigger pin 812, which engages the lever 814 and causes the coupler 800 to release from the pocket 804 of the locking portion 712. In some examples, the user release the handle lock 109 of FIG. 1 to enable the user to push on the handle 110, 702 and the arm 108, 704 to slide.

The example process 1800 includes rotating the stroller handle toward a seat hub (e.g., between the rear leg and the front leg) of the stroller frame (block 1806). For example, the user rotates the handle arm 108, 704 toward the seat hub or joint 124 coupling the front leg 112 and the rear leg 114. During rotation of the arm 108, 704, the pivot plate 807 of the handle hub 126, 708 pulls on the cable 318 that is wound about the router 900 of the pivot plate 807 and extends to the joint 124 via the rear leg 114. The pulling of the cable 318 releases the lock pin 1208 from the pin stop 1214 of the joint 124, thereby allowing the front leg 112 to pivot relative to the rear leg 114.

The example process 1800 includes locking the stroller handle to the stroller frame (block 1808). For example, the user rotates the handle arm 108 toward the seat joint 124 such that the storage pin 1100 of the mount bar 128 holds the handle arm 108 proximate to the rear leg 114.

The example process 1800 includes pivoting the stroller frame on the rear wheels of the stroller frame (block 1810). For example, the user tips the stroller frame 102 (with the handle arm 108 in the folded position) as if to lift the front wheels 116 off of the surface (e.g., a floor or ground) on which the stroller frame 102 rests.

The example process 1800 includes rotating the front legs relative to the rear legs (block 1812). In the example of FIG. 13, because the lock pin 1208 of the joint 124 is disengaged from the pin stop 1214, the first housing 1200 rotates relative to the second housing 1202 and, thus, the front leg 112 can rotate relative to the rear leg 114. The user can guide the front leg 112 and the front wheels 116 inward or toward rear leg 114. The detent arm 1224 of the joint 124 deflects so as to hold the front leg in the folded position. Thus, the example stroller frame 102 can be collapsed or folded for storage.

From the foregoing, it will be appreciated that methods and apparatus have been disclosed to provide for folding of a frame of a stroller. Disclosed example stroller frames provide for user initiation of the stroller frame folding via a handle of the stroller. For example, a user pushes down on the handle to reduce height of the stroller frame and to enable the handle to be rotated toward the rear legs via a handle hub. By rotating the handle, a joint locking the front leg in an extended position is released, thereby allowing the front leg to collapse relative to the rear leg. Thus, disclosed example stroller frames can be efficiently moved to a compact position for storage without requiring difficult or cumbersome actions by the user to fold the frame.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A frame for use with a stroller, the frame comprising:
a first leg;
a second leg;
a first joint to couple the first leg and the second leg;
a handle arm; and
a second joint to couple the handle arm and the first leg, the second joint including a first portion having a pocket and a second portion including a lock slidably disposed in the second portion and removably coupled to the pocket, the handle arm to rotate relative to the first leg via the second joint when the lock is removed from the pocket, the rotation of the handle arm via the second joint to enable the second leg to rotate relative to the first leg via the first joint to fold the frame.

2. The frame of claim 1, wherein the lock includes a first pin and further including a lever disposed in the second portion, the handle arm to cause the lever to rotate to release the first pin from the pocket.

3. The frame of claim 2, further including a cable disposed in the second portion, the cable having a first end coupled to the lever and a second end coupled to the lock, the rotation of the lever to remove the first pin from the pocket via the cable.

4. The frame of claim 2, further including a second pin disposed in the second portion, the second pin disposed proximate to the lever.

5. The frame of claim 4, wherein an end of the handle arm is to engage the second pin to cause the lever to rotate.

6. The frame of claim 4, further including a spring coupled to the second pin.

7. The frame of claim 1, further including a router disposed in the second portion and a cable extending between the router and the first joint.

8. The frame of claim 7, wherein the lock is a first lock and further including a second lock disposed in the first joint, wherein the rotation of the handle arm is to cause the cable to pull the second lock to enable the second leg to rotate.

9. The frame of claim 1, wherein the first portion is spaced part from the second portion during rotation of the handle arm.

10. A frame for use with a stroller, the frame comprising:
a first frame member having a first wheel coupled thereto;
a second frame member having a second wheel coupled thereto;
a third frame member;
a first joint to couple the first frame member and the second frame member, the first joint including a lock; and
a second joint to couple the second frame member and the third frame member, the second joint operatively coupled to the first joint, the second joint including:
a pocket;
a coupler to be removably received in the pocket when the coupler is in a first position; and
a lever, the third frame member to operatively cause the lever to rotate, the rotation of the lever to cause the coupler to move from the first position to a second position in which the coupler is removed from the pocket, the third frame member to rotate via the second joint when the coupler is removed from the pocket to release the lock to enable the first frame member to move from an extended position to a collapsed position to fold the frame.

11. The frame of claim 10, further including a cable extending from the second joint to the lock, the cable to displace the lock during rotation of the third frame member.

12. The frame of claim 11, further including a plate disposed in the second joint, the plate including a router, the cable to be at least partially wound about the router, the third frame member to pivot about the plate.

13. The frame of claim 10, wherein the lock is a first lock and the coupler includes a second lock, the third frame member to slide relative to the second joint to release the second lock to enable the third frame member to rotate.

14. The frame of claim 13, wherein the second lock is coupled to the lever via a cable.

15. The frame of claim 14, further including a spring coupled to the second lock.

16. A frame for use with a stroller, the frame comprising:
a first leg;
a second leg;
a first joint to couple the first leg and the second leg;
a handle arm; and
a second joint to couple the handle arm and the first leg, the second joint including:
a release portion;
a locking portion; and
means for removably coupling the release portion and the locking portion, wherein the handle arm is to operatively uncouple the release portion from the locking portion, the handle arm to rotate relative to the first leg via the second joint when the release portion is uncoupled from the locking portion, the rotation of the handle arm via the second joint to enable the second leg to rotate relative to the first leg via the first joint to fold the frame.

17. The frame of claim 16, wherein the means for removably coupling the release portion to the locking portion includes a protrusion disposed on end of the release portion, the protrusion to be received in a pocket of the locking portion.

18. The frame of the claim 17, wherein the protrusion includes means for locking the protrusion to the locking portion.

19. The frame of claim 18, wherein the means for locking includes a lock pin.

20. The frame of claim 19, further including a lever disposed in the release portion, the lever operatively coupled to the lock pin, the handle arm to engage the lever to cause the release portion to uncouple from the lock portion via the lock pin.

* * * * *